US011681981B2

United States Patent
Rehn et al.

(10) Patent No.: US 11,681,981 B2
(45) Date of Patent: *Jun. 20, 2023

(54) ITEM TRACKING SYSTEMS AND METHODS FOR FINE TUNED DELIVERY SCHEDULING

(71) Applicant: Coupang Corp., Seoul (KR)

(72) Inventors: Erik Rehn, Seoul (KR); Hyun Sik Eugene Minh, Seoul (KR); Yoo Suk Kim, Seoul (KR)

(73) Assignee: Coupang Corp., Seoul (KR)

( * ) Notice: Subject to any disclaimer, the term of this patent is extended or adjusted under 35 U.S.C. 154(b) by 178 days.

This patent is subject to a terminal disclaimer.

(21) Appl. No.: 17/218,233

(22) Filed: Mar. 31, 2021

(65) Prior Publication Data

US 2021/0287160 A1 Sep. 16, 2021

Related U.S. Application Data

(63) Continuation of application No. 16/733,442, filed on Jan. 3, 2020, now Pat. No. 10,997,550.

(51) Int. Cl.
*G06Q 10/00* (2023.01)
*G06Q 10/087* (2023.01)
(Continued)

(52) U.S. Cl.
CPC ....... *G06Q 10/087* (2013.01); *G06Q 10/0833* (2013.01); *G06Q 30/0635* (2013.01); *G06Q 50/28* (2013.01); *H04W 4/029* (2018.02)

(58) Field of Classification Search
CPC ............ G06Q 10/087; G06Q 10/0833; G06Q 30/0635; G06Q 50/28; G06Q 10/06312;
(Continued)

(56) References Cited

U.S. PATENT DOCUMENTS 7,177,825 B1    2/2007 Borders et al.
10,997,550 B1 * 5/2021 Rehn ............... H04W 4/021
(Continued)

FOREIGN PATENT DOCUMENTS

CN    107851237 A      3/2018
JP    2004067356 A  *  3/2004
(Continued)

OTHER PUBLICATIONS

Hong Kong Examination Notice from The Government of the Hong Kong Special Administrative Region Intellectual Office Department dated Jan. 17, 2022, for corresponding application No. 22020022242.4 (5 pages).

(Continued)

*Primary Examiner* — Russell S Glass
(74) *Attorney, Agent, or Firm* — Finnegan, Henderson, Farabow, Garrett & Dunner, LLP

(57) ABSTRACT

A computer-implemented system for delivery scheduling from a fulfillment center. The system includes a memory storing instructions and one or more processors configured to execute the instructions to perform operations. The operations may include maintaining a first data structure representing a fulfillment center, where the data structure has elements representing portions of the fulfillment center the portions are associated with a plurality of physical locations and a cutoff time. The operations may also include maintaining a second data structure including a mapping between physical locations and product identifiers, receiving a request to provide a delivery time estimate, searching the second data structure to identify at least one physical location associated with the requested product, searching the first data structure to determine cutoff times associated with each of the at least one physical location, and returning, (Continued)

responsive to the request, a fast cutoff time selected from the cutoff times.

20 Claims, 20 Drawing Sheets

(51) Int. Cl.
*G06Q 30/0601* (2023.01)
*G06Q 50/28* (2012.01)
*H04W 4/029* (2018.01)
*G06Q 10/0833* (2023.01)

(58) Field of Classification Search
CPC ........ G06Q 10/06314; G06Q 10/0832; H04W 4/029; H04W 4/021; H04W 4/35
USPC .......................................................... 705/28
See application file for complete search history.

(56) References Cited

U.S. PATENT DOCUMENTS

| | | | |
|---|---|---|---|
| 2002/0188499 A1 | 12/2002 | Jenkins et al. | |
| 2005/0187834 A1 | 8/2005 | Painter et al. | |
| 2015/0375398 A1* | 12/2015 | Penn | B25J 5/005 700/218 |
| 2021/0027236 A1* | 1/2021 | Elazary | B25J 9/1661 |

FOREIGN PATENT DOCUMENTS

| | | | |
|---|---|---|---|
| JP | 2004067356 A | 3/2004 | |
| JP | 2005206281 A | 8/2005 | |
| JP | 2016528597 A | 9/2016 | |
| KR | 2001-0077596 A | 8/2001 | |
| KR | 101735018 B1 | 5/2017 | |
| KR | 10-2017-0133999 A | 12/2017 | |
| KR | 10-2019-0011855 A | 2/2019 | |
| KR | 10-2019-0048674 A | 5/2019 | |
| TW | 201913262 A | 4/2019 | |
| WO | WO-0044649 A1 * | 8/2000 | ........... B65G 1/1373 |

OTHER PUBLICATIONS

Notice of Preliminary Rejection issued by the Korean Patent Office for counterpart Korean Patent Application No. 10-2020-0016355, dated Nov. 25, 2020. 14 pages.

Worldwide Intellectual Property Service (WIPS) Search Report for Korean Patent Application No. 10-2020-0016355, dated Aug. 12, 2020. 9 pages.

Taiwan Office Action from the International Property Office dated Aug. 30, 2021, for counterpart Application No. 109144538 (8 pages) and Translation (8 pages).

Notice of Preliminary Rejection from the Korean Intellectual Property Office for corresponding Korean Patent Application No. KR10-2021-008589, dated Mar. 14, 2022 (7 pages) and translation (8 pages).

Notice of Last Preliminary Rejection from the Korean Intellectual Property Office, dated Sep. 23, 2022, for counterpart Application No. 10-2021-0085891. (4 pages) and Translation (3 pages).

Further Examination Notice of Standard Patent Application No. 22020022242.4, dated Aug. 8, 2022. (2 pages).

* cited by examiner

```
1600

<html>
  <head>
    <title></title>
    <script type="text/javascript">
      function txnfn(){
        //GET DOCUMENT TYPE;
          if(document.getElementById("txnType").value=='SEARCH'){
            x=1;
          }else{
            if(document.getElementById("txnType").value=='SINGLE DISPLAY'){
              x=2
            }
          }
        //GENERATE TEXT BOX WITH DATE FOR DELIVERY ESTIMATE
        function  txn40()
        {
          WHEN x=1     var dt = document.getElementById("txndt").value;
          var TEXTBOX = new Date(dt);
                //CHANGE FOR DEFAULT FORMAT
              document.getElementById("duedt").value =
                    dat.toLocaleFormat('%d-%b-%Y');
        }
    </script>
  </head>
  <body>
      PageType: <select name="search" id="display;">
        <option value="x=1">MODIFY FOR SEARCH</option>
        <option value="x=2">MODIFY FOR DISPLAY</option>
      </select>
      <br/><br/>
         //ADD OR MODIFY WEBPAGE
      Delivery date:<input id ="txndt" type="date"
      <br/><br/>
          <div id="duedtdiv">
      Timer date:<input id ="duedt" type="date" name ="due_date" readonly/>
          </div>
    </body>
</html>
```

ITEM TRACKING SYSTEMS AND METHODS FOR FINE TUNED DELIVERY SCHEDULING

CROSS-REFERENCE TO RELATED APPLICATIONS

This application is a continuation of application Ser. No. 16/733,442, filed Jan. 3, 2020, the disclosure of which is expressly incorporated herein by reference in its entirety.

TECHNICAL FIELD

The present disclosure generally relates to computerized systems and methods for delivery scheduling. In particular, embodiments of the present disclosure relate to inventive and unconventional item tracking systems and methods for fine-tuning delivery scheduling based on fulfillment center virtualization.

BACKGROUND

Fulfillment centers (FCs) are warehouses that specialize in warehousing, packing, and shipping orders. There are multiple types of FCs. For example, a fulfillment center may be a large warehouse filling large commercial orders to a retailer or distributor. However, an FC may also encompass centers that strictly focus on shipping small parcels direct-to-consumers (DTC). Additionally, some FCs focus on a niche, such as small or large products, a specific type of product (such as sports goods), or certain number of stock keeping units (SKUs). FCs may also manage inventory and handle returns or exchanges by contracting directly to vendors and/or manufacturers. In such situations, FCs may become responsible for inventory problems such as "mispicks" (in which the wrong product is selected to fill an order) and "misships" (in which the wrong item is sent to the customer). In many cases, FCs must absorb the costs of mistakes.

Recently, FCs, and FC operations, have turned significantly more complex. Some of the current FCs are very large, carry many products (each product with specific conditions for shipping and labeling), and must offer multiple delivery options to provide more options to customers. Further, some FCs are required to fulfill a very large number of orders in short periods of time and must meet very quick promise delivery dates, requiring FCs to strictly coordinate deliveries to minimize liabilities. Thus, FCs are under pressure to improve their delivery times, minimize mistakes, and reduce costs.

The increased complexity of FC operations is compounded by new customer expectations that demand higher personalization of service, putting a heavy burden on FCs to achieve very quick turnarounds at a very low cost. For example, customers now expect very quick deliveries (even deliveries within a few hours) and expect to pay no, or very small, shipping and handling fees. To meet these customer demands, FCs attempt to develop efficient workflows that allow expedited shipping at a minimum cost. However, in large and complex FC's workflows are complex to manage or difficult to implement. Further, in some FC's it is difficult to create independent workflows because they may require diverting from a standard procedure. For example, certain FC's may attempt to keep shipping prices low by using standard procedures that can be implemented cheaply. However, such standard procedures may not fulfill customer demands of personalized and quick shipments, creating a tension between efficiency and customer satisfaction.

The disclosed computerized item tracking systems and methods for fine-tuned delivery scheduling address one or more of the problems set forth above and/or other problems in the prior art.

SUMMARY

One aspect of the present disclosure is directed to a computer-implemented system for delivery scheduling from a fulfillment center. The system may include a memory storing instructions and at least one processor configured to execute the instructions to perform operations. The operations may include maintaining a first data structure representing a fulfillment center, where the data structure stores elements representing portions of the fulfillment center and each of the portions is associated with a plurality of physical locations in the respective portion and a cutoff time for delivery, before a first time period, of products in the physical locations. The operations may also include maintaining a second data structure including a mapping between physical locations and product identifiers, receiving a request to provide a delivery time estimate associated with a requested product, and searching the second data structure to identify at least one physical location associated with the requested product. Moreover, the operations may also include searching the first data structure to determine a cutoff time associated with each of the at least one physical location and returning, responsive to the request, a selected cutoff time.

Another aspect of the present disclosure is directed to a computer-implemented method for delivery scheduling from a fulfillment center. The method may include maintaining a first data structure representing a fulfillment center, where the data structure includes elements representing portions of the fulfillment center and each of the portions is associated with a plurality of physical locations in the respective portion and a cutoff time for delivery, before a first time period, of products in the physical locations. The method may also include maintaining a second data structure including a mapping between physical locations and product identifiers, receiving a request to provide a delivery time estimate associated with a requested product, searching the second data structure to identify at least one physical location associated with the requested product. The method may also include searching the first data structure to determine a cutoff time associated with each of the at least one physical location and returning, responsive to the request, a selected cutoff time.

Yet another aspect of the present disclosure is directed to a non-transitory computer-readable medium storing instructions that, when executed by a processor, perform operations for delivery scheduling from a fulfillment center. The operations may include maintaining a first data structure representing a fulfillment center, where the data structure includes elements representing portions of the fulfillment center and each of the portions is associated with a plurality of physical locations in the respective portion and a cutoff time for delivery, before a first time period, of products in the physical locations. The operations may also include maintaining a second data structure including a mapping between physical locations and product identifiers, receiving a request to provide a delivery time estimate associated with a requested product, filtering the physical locations in the second data structure based on the customer device to identify at least one physical location associated with the requested product, and requesting available inventory from fulfillment centers associated with the filtered physical locations. Moreover, the operations may also include selecting a fulfillment center from the fulfillment centers based on distance between a location associated with a customer device and the fulfillment centers, searching the first data structure for each of the plurality of physical locations to determine a plurality of cutoff times, selecting one of the physical locations based on a comparison between a current time and respective cutoff times and returning (responsive to the request) a selected cutoff time.

Other systems, methods, and computer-readable media are also discussed herein.

BRIEF DESCRIPTION OF THE DRAWINGS

FIG. 16 is an exemplary source code of a script configurable to generate or modify a webpage with delivery date estimates and/or available delivery options.

DETAILED DESCRIPTION

Figure 1A:
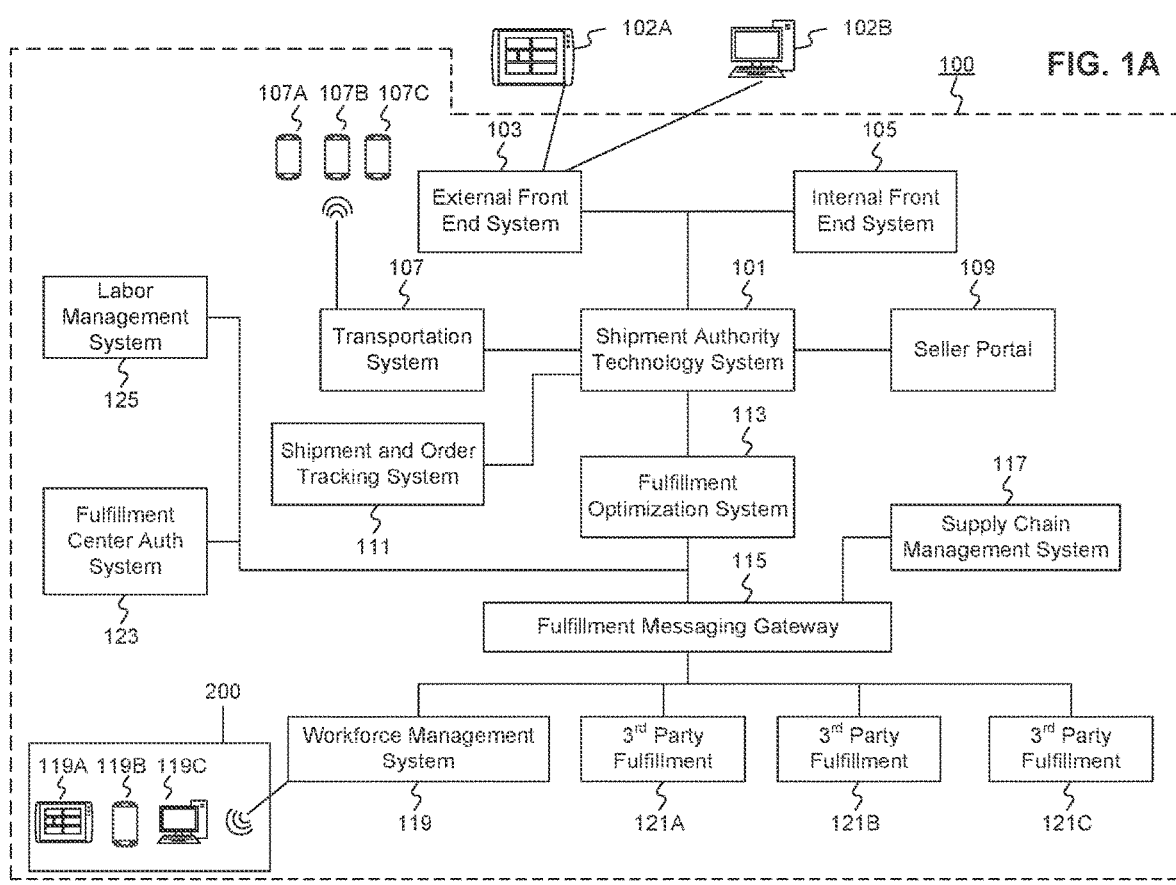
FIG. 1A is a schematic block diagram illustrating an exemplary embodiment of a network including computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods for delivery scheduling form a fulfillment center (FC). The disclosed systems and methods may employ a tracking system of items that allow to determine the location of items or products in the fulfillment center. Based on the location within the FC, an FC computer system may determine specific delivery dates or cutoff times for each product or item. Thus, the disclosed systems and methods may enhance the efficiency of FC shipping workflows and enable greater personalization of delivery times or options by specifying deliveries dates, times, and options for each product. For example, each item or product in an FC may have a specific cutoff time based on the product's location. The cutoff time may indicate the latest time an order must be processed to meet a promised delivery date (PDD). Thus, disclosed systems and methods may allow determining product or location specific cutoff times based on item locations within the FC, and/or the product distance to the FC's packing and shipping center.

Further, the disclosed systems and methods may also enable automated tracking of product position or location within the FC. For example, the disclosed systems and methods may use wired and wireless sensors to track the location of the products with the FC. In such embodiments, the disclosed systems may include a network of sensors and/or tracking stations that allow the disclosed systems to determine the location of products or items within an FC. Such systems and methods may enable the creation of data structures that store the positioning of items in an FC to create tailored delivery schedules based on the item position. This grater granularization of items within an FC allows the disclosed systems and methods to create personalized shipping flows that allows systems to provide fine-tuned delivery schedules.

Moreover, the disclosed systems and methods for delivery scheduling may enable creating highly personalized websites that specify available delivery options. For example, the disclosed systems and methods may generate personalized websites that specify available delivery options for each product and for each client device. In such embodiments, the disclosed systems and methods may configure HTML or JavaScript files to generate or update a webpages. Moreover, the disclosed systems and methods may enhance accuracy of the delivery date estimation calculations by collecting and analyzing specific date for both preparing the package for delivery and for the delivery address.

Furthermore, embodiments of the disclosed systems and methods may be directed to improving computer operations in an FC. In particular, disclosed systems and methods may result in dynamically produced multi-source hybrid webpages that use information from FC systems, information from delivery addresses, and information from user preferences, to generate personalized websites. For example, the disclosed systems may produce dynamic hybrid webpages that combine information from the retailer (e.g., the availability and location of products), from the FC (e.g., the location of specific items in the FC and estimated time for shipping), information from the shipping agent (e.g., shipping routes and schedules), and information from the customer to (e.g., shipping preferences and postal code). Such multi-sourced arrangement of information may be used to generate multi-sourced webpages that shows products, tailored delivery options, specific delivery date estimates, promised delivery dates, and purchasing options.

Moreover, the disclosed systems and methods may automate the processes used for delivery scheduling using a real-time location system that tracks product location or position within the FC. This system of automated product tracking within the FC may allow to dynamically adjust delivery schedules and offering of available delivery options. For example, the disclosed systems and methods may use indoor real-time positioning systems to fine-tune delivery schedules and provide greater availability of delivery options or have faster turnarounds. Using technologies such as NFC, BLE, or bar code scanning to automate and maintain real time location systems, the disclosed systems and methods may allow FC systems to produce personalized websites and improve shipping and packing workflows.

Reference will now be made in detail to the disclosed embodiments, examples of which are illustrated in the accompanying drawings.

FIG. 1A shows a schematic block diagram of system 100 illustrating an exemplary embodiment of a system including computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

Further, in some embodiments SAT system 101 may be in communication and control item positioning systems that track and/or store products that are warehoused in the FC. For example, SAT system 101 may control systems that track the position of products multiple virtual locations of the FC, as further described in connection to FIG. 14.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may include one or more of these systems, while in another aspect, external front-end system 103 may include interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request. External front-end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

In some embodiments FO systems 113 may also be in communication with product position systems of FCs. In such embodiments, FO systems 113 may have precise information of the product, tentative delivery dates, available delivery options, and cutoff times for each one of the delivery options.

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. Further, the information could include the location of the product within the FC and estimated required time for shipping and delivery. This could include, for example, shelf or pallet position, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front-end system 103.

Figure 1D:
FIG. 1D depicts a sample cart page that includes items in a virtual shopping cart along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart.

In some embodiments, external front-end system 103 may be further configured to enable sellers to transmit and receive information relating to orders. For example, external front-end system 103 may allow sellers to transmit estimated packing time and/or available delivery options for specific products.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may include one or more of these systems, while in another aspect, internal front-end system 105 may include interfaces (e.g., server-to-server, database-to-database, or other network connections) connected to one or more of these systems. In some embodiments, internal front-end system 105 may be configured to direct workers for an FC to place items in specific locations. For instance, in some embodiments, SAT system 101 may be configured to perform predictive algorithms to identify the products that have a greater likelihood to be requested with a special delivery option. For example, SAT system 101 may be configured to identify the products that are most likely to be requested for dawn delivery or for first time delivery. In such embodiments, internal front-end system 105 may be in communication with SAT system 101 and produce websites and/or user interfaces for workers that guide product placement within the FC with the objective of improving delivery times and maximizing the number of products available for dawn, fresh, or first time delivery.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may include devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding cutoff time (maximum time for a specific delivery time) and/or PDD (promised delivery date) for each product. The cutoff time and PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like. Further, FO system 113 may calculate a cutoff time based on past deliveries, physical distance between the product location and the shipping center, and available personnel at the location of the FC, among others.

In some embodiments, FO system 113 may determine cutoff times and PDDs for each product on a periodic basis (e.g., hourly) and store it in a database for retrieval or sending to other systems (e.g., external front-end system 103, SAT system 101, shipment and order tracking system 111). In other embodiments, FO system 113 may receive electronic requests from one or more systems (e.g., external front-end system 103, SAT system 101, shipment and order tracking system 111) and calculate the PDD or cutoff time on demand. In yet other embodiments, FO system 113 may determine PDD and cutoff times as a user navigates through one of the webpages. Processes for calculation and transmission of PDD or cutoff times by FO system 113 are further described in connection to FIG. 7.

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the user of one of these devices to scan a package or that a sensor of the positioning systems has been triggered. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). Alternatively, a wireless sensor may determine a product has been taken into or out of the shelf. WMS 119 may store each event indicating a scan, a read of a package identifier, or a sensor event in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. Further, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
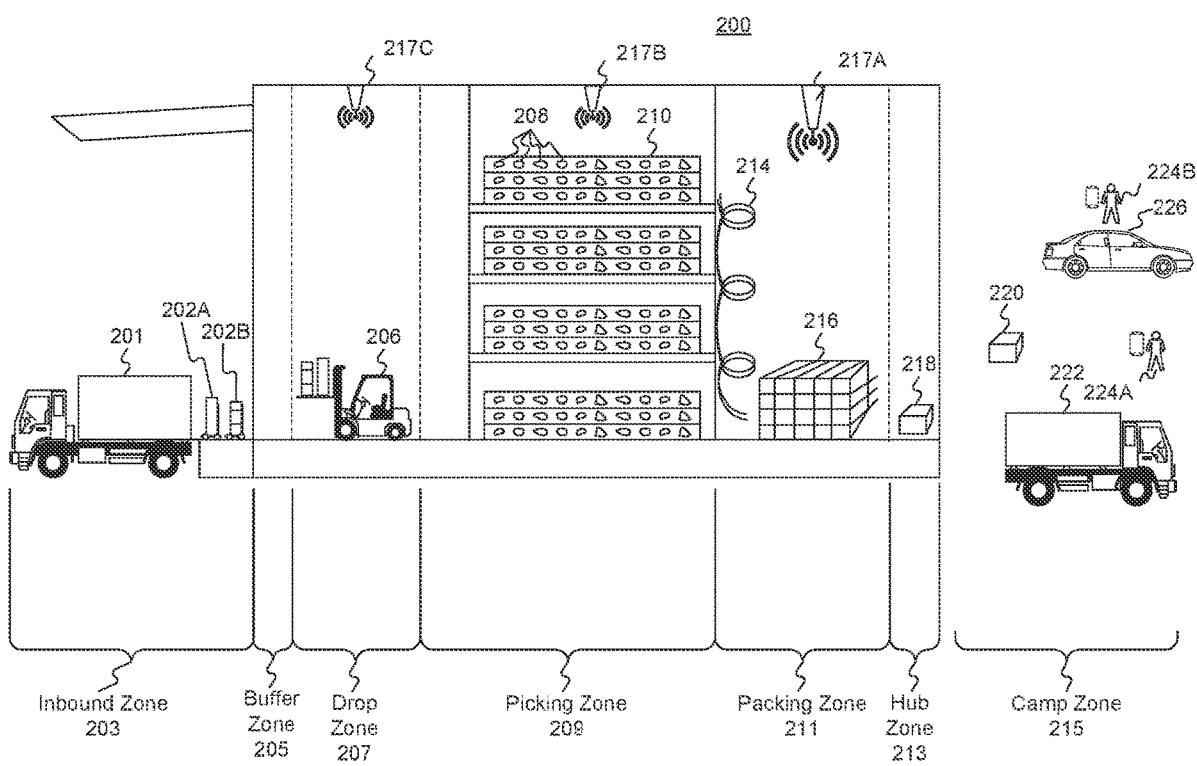
FIG. 2 is a diagrammatic illustration of an exemplary fulfillment center configured to utilize disclosed computerized systems, consistent with the disclosed embodiments.

FIG. 2 depicts a fulfillment center 200. Fulfillment center (FC) 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). Such event may update a real time location system that updates a database to specify the item has been moved into the FC. The picker may then take the item to picking zone 209 (e.g., by placing it on a cart or carrying it) and the real time location system may request the position of storage for the new item.

Picking zone 209 may be an area of FC 200 where items 208 are stored on storage units 210. In some embodiments, storage units 210 may include one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. In some embodiments, the location to stow item 202A may be determined based on predictive algorithms that attempt to maximize the availability of special delivery options, such as dawn deliveries. The device may then prompt the picker to scan a barcode at that location before stowing item 202A in that location. Alternatively, a wireless sensor or a camera coupled with image recognition, may store the location of the time. In some embodiments, the device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. In some embodiments, as further described in connection with FIG. 11, the picker may receive instructions through a placement or storing guide to stow the products. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may include, for example, determining a portion of a geographical area that the package is destined for (e.g., based on a postal code) and determining a camp zone 215 associated with the portion of the geographical area.

Camp zone 215, in some embodiments, may include one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, a delivery option, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

In some embodiments, as shown in FIG. 2, one or more of the sections of FC 200 may include a positioning system 217. Positioning system 217 may include a plurality of sensors that may be used to determine the position of products within the FC and track their movement through the FC. In such embodiments, sensors of positioning system 217 may be used for both, tracking the position of products in the FC and also estimating movement between different sections. For instance, sensors of positioning system 217 may be used to store historic data of time elapsed between the different regions of FC 200. This information may then be used for determining distances or estimated times between storing zones and packing zones.

As shown in FIG. 2 the positioning system 217 may include sensors 217A in packing zone 211, sensors 217B in picking zone 209, and sensors 217C in drop zone 205. However, more sensors may be placed in different regions of FC 200 with the goal of tracking and capturing the position of items in FC 200 and improve the accuracy of estimated deliveries or maximize the availability of delivery options.

Figure 3:
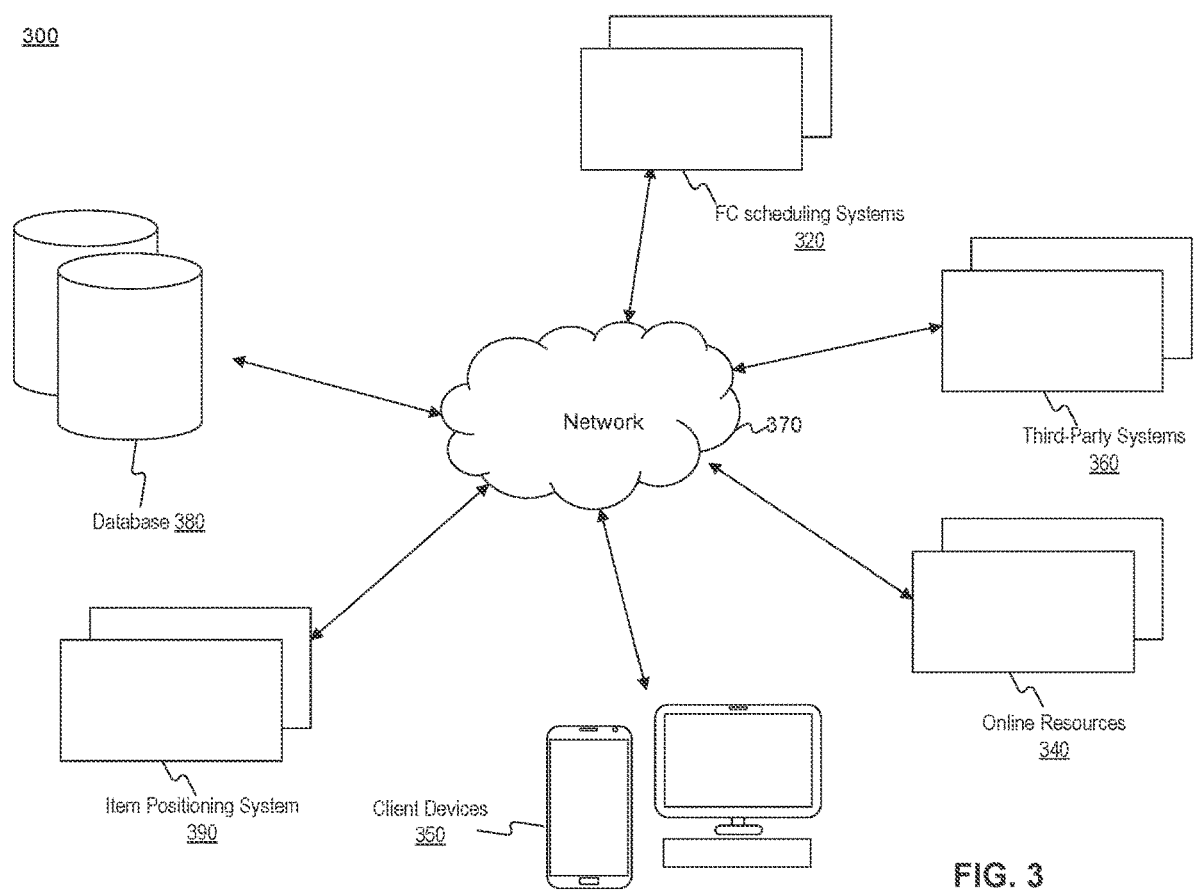
FIG. 3 is a schematic block diagram of an exemplary system, consistent with disclosed embodiments.

FIG. 3 is a block diagram of an exemplary system 300, consistent with disclosed embodiments. In system 300 a scheduling system 320 may process product requests from real-time client device's data streams to, for example, determine whether dawn delivery is available, a PDD, or estimated delivery for a product. The system may also generate instructions to display or modify a webpage to include the estimated delivery data. System 300 may include scheduling systems 320, online resources 340, client devices 350, third-party systems 360, item positioning systems 390, and database 380. In some embodiments, as shown in FIG. 3, components of system 300 may be connected to a network 370. However, in other embodiments components of system 300 may be connected directly with each other, without network 370. For example, database 380 may be directly coupled to scheduling systems 320.

In some embodiments, scheduling systems 320 may be implemented with one or more of the components of system 100 (FIG. 1A). For example, scheduling systems 320 may include SAT system 101, external front-end system 103, FO system 113, SCM system 117, and/or WMS 119 (FIG. 1A). In other embodiments, scheduling systems 320 may be implemented with one or more independent servers configured to perform operations for estimating a delivery date, generating a PDD, and/or updating or generating webpages for client devices 350.

Online resources 340 may include one or more servers or storage services provided by an entity such as a provider of webpage hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as, for example, Apple Push Notification Service, Azure Mobile Services, or Google Cloud Messaging. In such embodiments, online resources 340 may handle the delivery of messages and notifications related to functions of the disclosed embodiments, such as handling digital rights management.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102 (FIG. 1A) and be operated as part of system 100. In other embodiments, however, client devices 350 may be independent from system 100. Client devices 350 may include one or more processors configured to execute software instructions stored in memory, such as memory included in client devices 350, to perform operations to implement the functions described below. For example, client devices 350 may be configured to display graphical user interfaces in webpages that include delivery date estimates generated by scheduling systems 320. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

Figure 4:
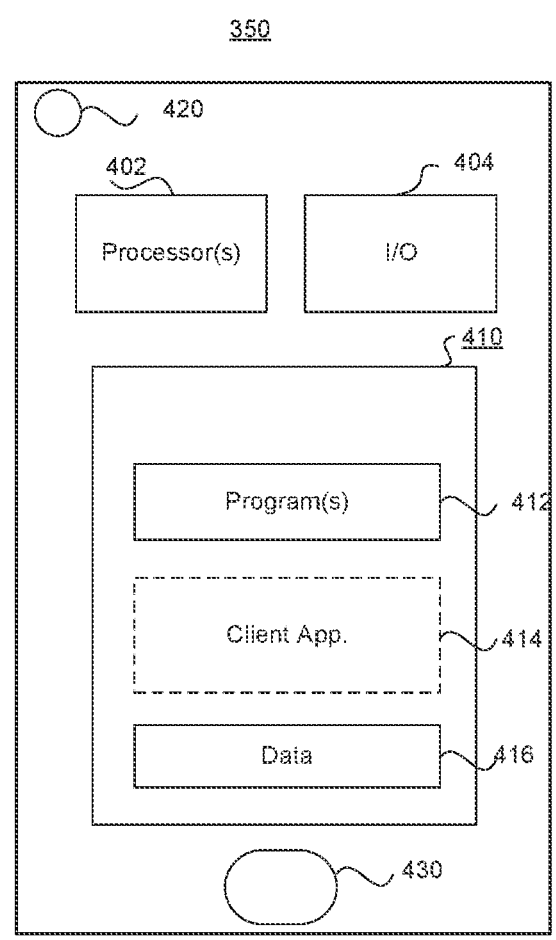
FIG. 4 is a block diagram of an exemplary client device, consistent with disclosed embodiments.

In some embodiments, as further disclosed in connection to FIG. 4, client devices 350 may run applications specifically configured to interact with scheduling systems 320. Moreover, client devices 350 may store one or more accounts. For example, client devices 350 may store information about a customer's delivery preferences, the customer's location, customer account, and customer identification.

The disclosed embodiments are not limited to any particular configuration of client devices 350. For instance, a client device 350 may be a mobile device that stores and executes mobile applications to perform operations that provide functions offered by scheduling systems 320 and/or online resources 340. In certain embodiments, client devices 350 may be configured to execute software instructions relating to location services, such as GPS locations. For example, client devices 350 may be configured to determine a geographic location and provide location data and time stamp data corresponding to the location data. Client devices 350 are further described in connection with FIG. 4.

Database 380 may include one or more computing devices configured with appropriate software to perform operations consistent with providing scheduling systems 320 data for calculating and/or retrieving estimated delivery dates and their respective cutoff times. Database 380 may include, for example, Oracle™ databases, Sybase™ databases, or other relational databases or non-relational databases, such as Hadoop™ sequence files, HBase™, or Cassandra™. Database 380 may include computing components (e.g., database management system, database server, etc.) configured to receive and process requests for data stored in memory devices of the database(s) and to provide data from the database(s).

While database 380 are shown separately, in some embodiments database 380 may be included in, or otherwise related to scheduling systems 320 or online resources 340.

Database 380 may be configured to collect and/or maintain data associated with user accounts or products to facilitate delivery date or PDD estimations. For example, database 380 may store information about user profiles for users of system 300. Database 380 may also store data structures that specify the location of products within an FC, an estimated packing time, and a cutoff time for specific deliveries, such as a cutoff time for dawn deliveries. Database 380 may also store other information about the location for the previously calculated delivery dates for a specific product and corresponding postal code, to quickly respond to delivery date estimation requests that have similar product and postal code pair. Database 380 may collect the data from a variety of sources, including, for instance, online resources 340 or third-party systems 360. Further, database 380 may include information about client devices 350 operating systems. Database 380 are further described below in connection with FIG. 5.

In some embodiments, third-party systems 360 may include one or more elements of system 100. For example, third-party systems 360 may include 3PL systems 121A-121C. Additionally, or alternatively, third-party systems 360 may include one or more servers or storage services provided by an entity related to scheduling systems 320, such as a provider of services or a fulfillment center. Third-party systems 360 may also be connected to system 300 via network 370, but in other embodiments third-party systems 360 may include direct connections with some elements of system 300. For example, to minimize delays or network congestion third-party systems 360 may be connected in a private network with scheduling systems 320. Further, third-party systems 360 may be configured to provide and/or request information from scheduling systems 320, or other elements of system 300. In some embodiments, while third-party systems 360 may also be coupled to network 370, they may not be clients of scheduling systems 320. Instead, third-party systems 360 may include systems that include information of users or clients of scheduling systems 320. For example, third-party systems 360 may include servers of delivery contractors such as FedEx®, which may be used by scheduling systems 320 when a product delivery involves a third-party contractor. Similarly, if a product is not available within fulfillment centers in system 100 (FIG. 1), third-party systems 360 may perform their own calculations and inform scheduling systems 320 about the tentative delivery date or PDD.

Item positioning systems 390 may include sensors and processors for determining and/or storing the location of products within an FC. For example, item positioning systems 390 may include sensors 217A-217C (FIG. 2). Alternatively, or additionally, item positioning systems 390 may include cameras that capture images of shelves and use image recognition methods to identify products and determine the position of products in the FC. Further, item positioning systems 390 may be coupled to scan devices and track the positioning of products in an FC by monitoring scanning events of products. Moreover, item positioning systems 390 may be in communication with scheduling systems 320 to provide information that facilitates estimating cutoff times for specific delivery times or to provide more accurate PDDs.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Referring now to FIG. 4, there is shown a block diagram of an exemplary client device 350 (FIG. 3), consistent with disclosed embodiments. In some embodiments, client devices 350 may implement user devices 102 (FIG. 1A).

In one embodiment, client devices 350 may include one or more processors 402, one or more input/output (I/O) devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit, and the like based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Intel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also include a client application 414 which may configure client devices 350 to communicate or execute operations to interact with other elements of system 300. For example, client application 414 may specify instructions to communicate with scheduling systems 320 and/or generate product information requests, as further described in connection with FIG. 7. In addition, client applications 414 may interpret instructions for generating graphical user interfaces (GUI) in client devices 350 or modifying displayed GUI. Memory 410 may also store data 416 that may be used by scheduling systems 320 to assign deliveries estimates or PDDs to the client device.

In certain embodiments, memory 410 may store instructions for accessing or sending requests to scheduling systems 320. For example, memory 410 may include an application that communicates with scheduling systems 320 via TCP/IP. Moreover, other software components may be configured to request information from scheduling systems 320 or determine the location of client devices 350. For instance, these software instructions, when executed by processor(s) 402, may process information to display available delivery options for the product or PDD in a webpage. The software instructions may also implement scripts to modify webpages being displayed in client devices 350.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. I/O devices 404 may also include one or more accelerometers to detect the orientation and inertia of client devices 350. I/O devices 404 may also include other components known in the art for interacting with scheduling systems 320.

In some embodiments, client devices 350 may also include a camera 420 that capture images and may be used for identification of a product that the user wants. Such identification may trigger the delivery date estimation or PDD calculation. Additionally, or alternatively, client devices 350 may include a fingerprint sensor 430 that allows users to unlock client devices 350 to access their accounts, send request for information, and purchase items. Both camera 420 and fingerprint sensor 430 may be operated by processor 402 and use encryption security to make it impossible for users to externally access fingerprint or camera information.

The components of client devices 350 may be implemented in hardware, software, or a combination of both hardware and software, as will be apparent to those skilled in the art.

Figure 5:
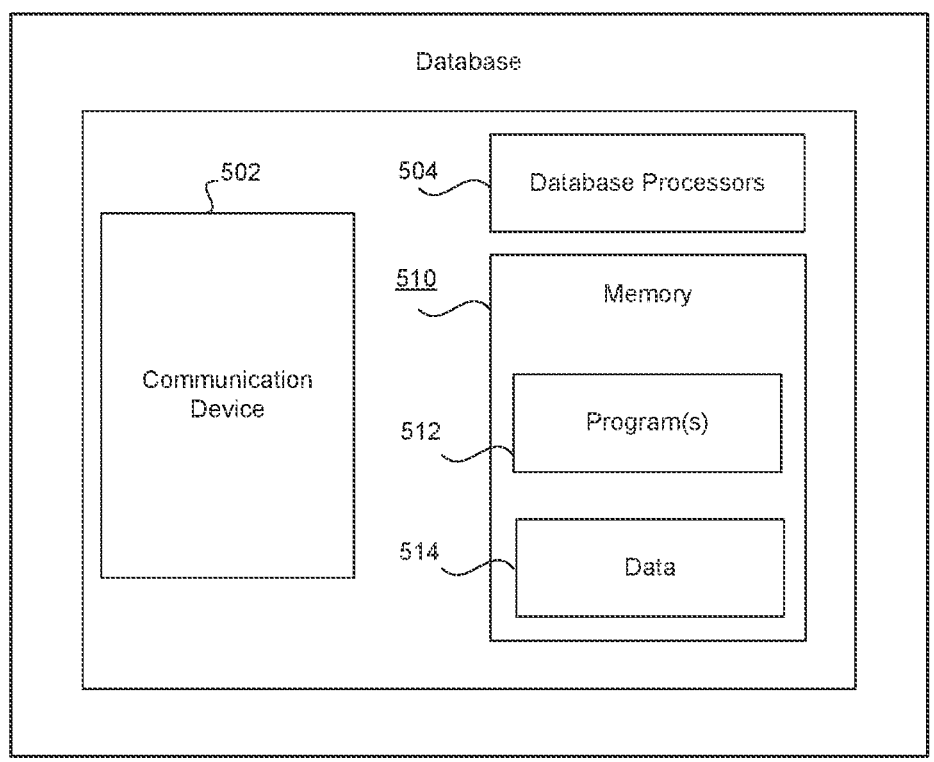
FIG. 5 is a block diagram of an exemplary database, consistent with disclosed embodiments.

Referring now to FIG. 5, there is shown a block diagram of an exemplary database 380 (FIG. 3), consistent with disclosed embodiments. In some embodiments, database 380 may be included in elements of system 100. For example, database 380 may be part of the FO system 113 or the WMS 119 (FIG. 1A).

Database 380 may include a communication device 502, one or more database processors 504, and database memory 510 including one or more database programs 512 and data 514. Database 380 may include NoSQL databases such as HBase, MongoDB™ or Cassandra™. Alternatively, database 380 may include relational databases such as Oracle, MySQL and Microsoft SQL Server.

In some embodiments, database 380 may take the form of servers, general purpose computers, mainframe computers, or any combination of these components. In some embodiments, database 380 are included within other elements of system 300, such as scheduling systems 320. Other implementations consistent with disclosed embodiments are possible as well.

In some embodiments, database 380 may include both non-relational and embedded databases. For example, database 380 may include a non-relational database, such as an Hbase, and an embedded database, such as a RocksDB (e.g., a key-value store database).

Communication device 502 may be configured to communicate with one or more components of system 300 or system 100, such as online resources 340, scheduling systems 320, or SCM system 117. In particular, communication device 502 may be configured to provide scheduling systems 320 order information, user preferences and privileges, position of products within the FC, and/or historic previous estimations for similar postal codes and products inquiries.

The components of database 380 may be implemented in hardware, software, or a combination of both hardware and software. For example, although one or more components of database 380 may be implemented as computer processing instruction modules, all or a portion of the functionality of database 380 may be implemented instead in dedicated electronics hardware.

Database memory 510 may include programs 512, which may include instructions to update webpages based on delivery estimates, PDDs received or generated by scheduling systems 320, or cutoff times associated with different zones in an FC. Further, database memory 510 may include instructions for communications between elements of system 300. For example, database memory 510 may include instructions for communications between client devices 350 and scheduling systems 320. Further programs 512 may include instructions to store information in real-time as it is processed by scheduling systems 320.

Data 514 may also be data associated with webpages, such as online resources 340, or user accounts from client devices 350. Data 514 may include, for example, information relating to previous delivery estimation calculations, available delivery options for products in an FC, or previous PDDs associated with postal codes. Data 514 may also include content files and accumulation variables to evaluate capacity of fulfillment centers and order availability.

Figure 6:
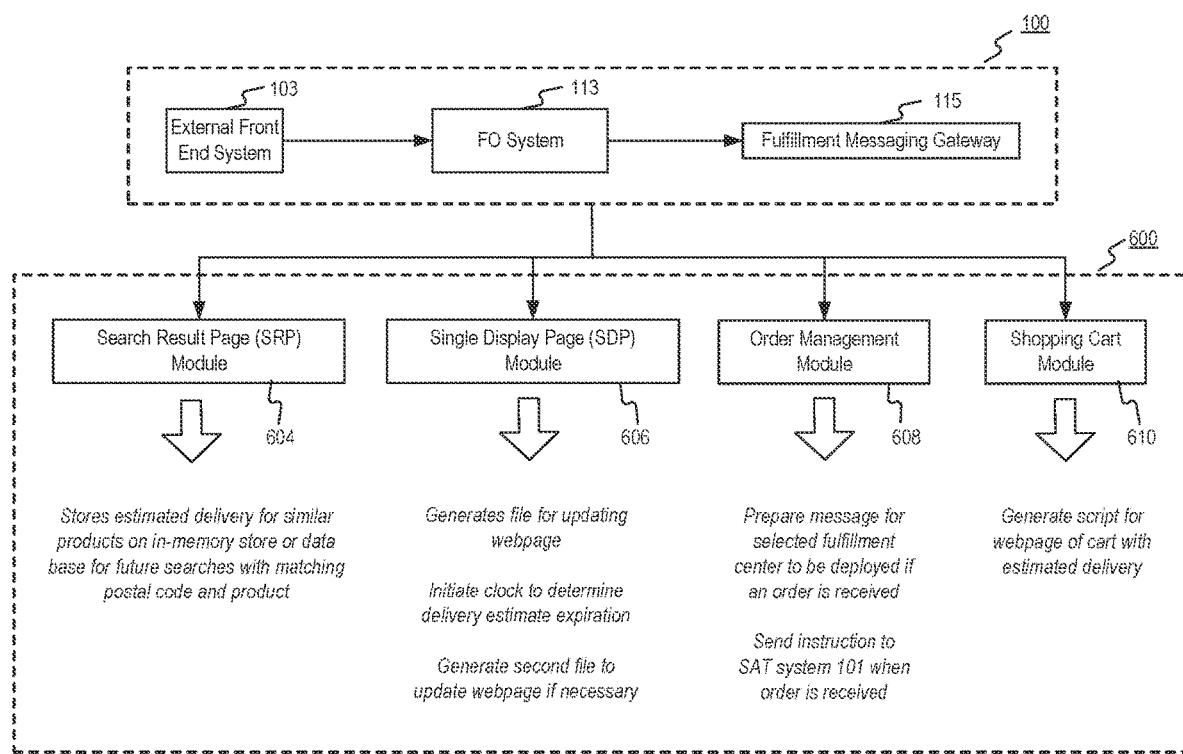
FIG. 6 is a process flow diagram of an exemplary delivery estimation distribution to online modules, consistent with disclosed embodiments.

FIG. 6 is a process flow diagram of an exemplary delivery estimation distribution, consistent with disclosed embodiments. In some embodiments, system 100, or portions of system 100, may perform calculations to determine an estimated delivery. System 100 may then transmit PDD information to online modules 600 that generate webpages for client interaction.

In some embodiments, as shown in FIG. 6, elements of system 100 may communicate with each other to generate an estimated delivery date or to identify the available delivery options. For example, external front-end system 103 may receive a request for a delivery estimate from user devices 102A-102B (FIG. 1A). The request may then be transmitted to an FO system 113 that may determine a selected fulfillment center and an estimated delivery time, as further described in connection to FIG. 9. Then FO system 113 may send the selected fulfillment center and estimated delivery date to fulfillment messaging gateway 115. In turn fulfillment messaging gateway 115 may send the information to the online modules 600.

Online modules 600 may include a search result page (SRP) module 604, a single display page (SDP) module 606, an order management module 608, and a shopping cart module 610. Each one of the modules may generate different webpages for display to consumers. For example, SRP module 604 may generate result pages (like the one described in connection with FIG. 1B) for user devices 102, while SDP module 606 may generate single product webpages (like the one described in connection with FIG. 1C) for user devices 102. Similarly, order management module 608 may generate or update order pages (like the one described in connection with FIG. 1E) while shopping cart module 610 may generate or update cart pages (like the one described in connection with FIG. 1D). Therefore, each one of online modules 600 may incorporate hypermedia elements in webpages to display the estimated delivery date, display delivery options, PDDs received from system 100, or cutoff times associated with delivery options.

Moreover, each one of online modules 600 may perform different operations when receiving estimated delivery dates. For example, after receiving a PDD SRP module 604 may store PDDs and/or delivery cutoff times for similar products and/or similar locations in cache memory for future searches. Then, when SRP module 604 receives a search request—within the cutoff time associated with the PDD or estimated delivery—that has the same or similar postal code and product, SRP module 604 does not need to query system 100. Instead, SRP module 604 may immediately update the search webpage based on previous information. Conversely, SDP module 606 may generate files for updating product webpages when receiving a PDD or delivery estimate. For example, SDP module 606 may generate a JavaScript or HTML file that updates the product webpage. Further SDP module 606 may initiate a clock or timer to determine if the delivery date estimation has expired. In such embodiments, SDP module 606 may generate a second file to update the single product webpage if necessary (e.g., the estimated delivery time has expired).

Further, order management module 608 may also react to receiving PDDs or estimated delivery dates from system 100. For example, in response to receiving estimated delivery date, order management module 608 may prepare an electronic message for a selected fulfillment center. This preparatory message may be configured to be deployed if an order is received. In this way, online modules 600 may prepare for potential orders and facilitate meeting the a PDD by minimizing delays between order and transmission to fulfillment centers. In some embodiments, order management module 608 may be coupled to SAT system 101 (FIG. 1A) and the preparatory message may be forwarded to SAT system 101 as soon as an order is received. Moreover, shopping cart module 610 may generate a script for updating cart webpages using the delivery date information. For example, shopping cart module 610 may modify cart webpages to include timers and/or counters based on the expiration times of the estimated delivery dates. Alternatively, or additionally, shopping cart module 610 may modify websites to indicate cutoff times for multiple delivery options based on the product locations within the FC.

Figure 7:
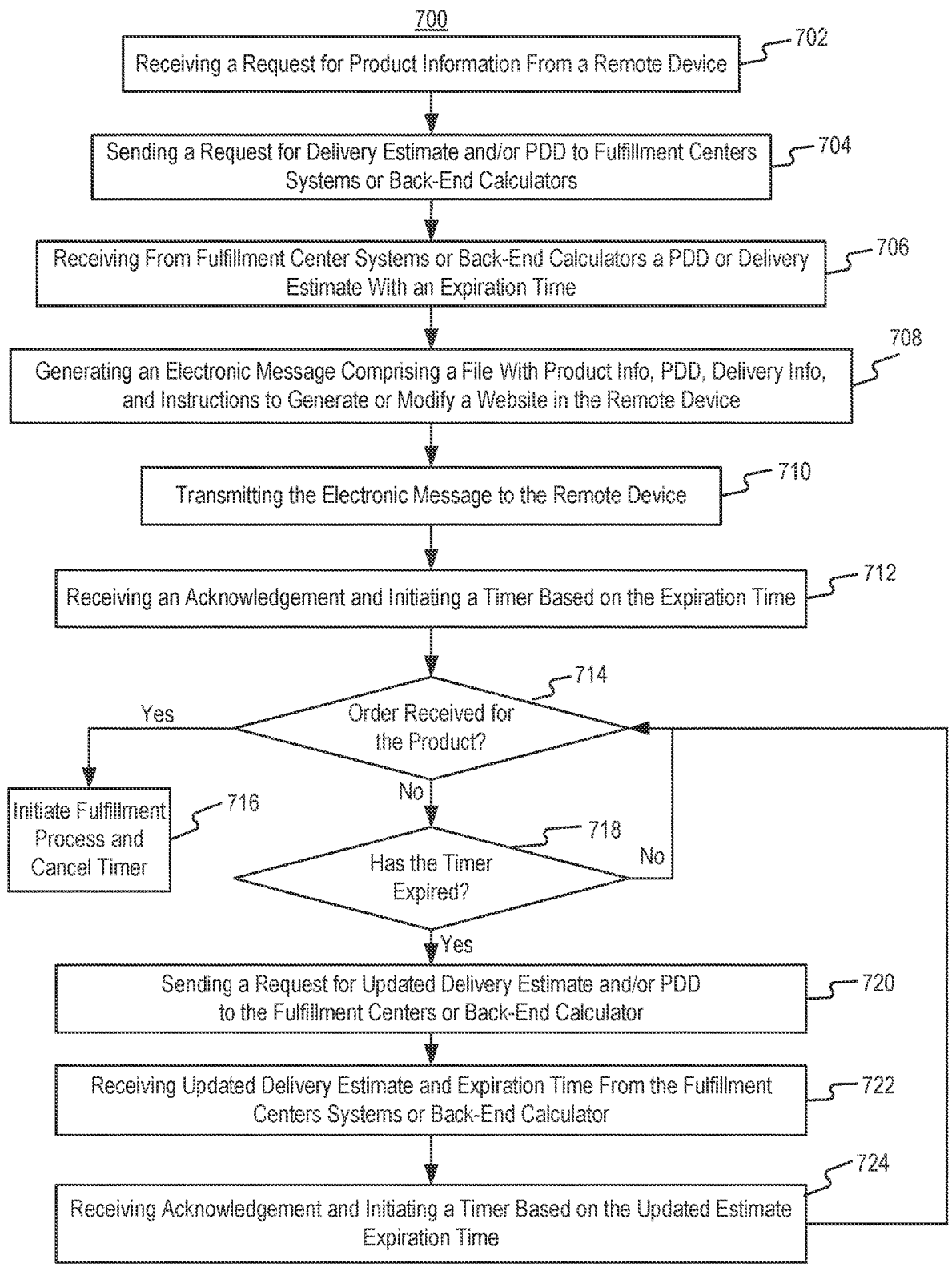
FIG. 7 is a flow chart of an exemplary process for handling a request for product delivery estimate, consistent with disclosed embodiments.

FIG. 7 is a flow chart of an exemplary process 700 for handling a request for product delivery estimate, consistent with disclosed embodiments. In some embodiments, elements of system 300 may perform process 700. For example, as disclosed in the description below, scheduling systems 320 may perform process 700. This is just an illustrative example of process 700, however, and in other embodiments system 100, or parts of system 100, may perform process 700. For example, Shipment Authority Technology System 101, FO System 113, and/or order tracking system 111 (FIG. 1A) may perform one or more of the steps in process 700.

In step 702, scheduling systems 320 may receive a request for product information from a remote device. For example, as a user of client devices 350 navigates in a webpage, client devices 350 may send a request for product information to scheduling systems 320. Moreover, the request may include a username, a postal code, and a physical location. Alternatively, or additionally, scheduling systems 320 may receive the request from online resources 340. Online resources 340 may communicate with scheduling systems 320 to request product and estimated delivery information to prepare webpages. Further, online modules 600 may send requests for product information, estimated delivery, and/or product availability.

In step 704, scheduling systems 320 may send a request for delivery estimate based on the information received from the request in step 702. Scheduling systems 320 may prepare and send a request to other elements of system 300 or system 100. For example, scheduling systems 320 may prepare a request for estimated delivery and PDD for FO system 113. In such embodiments, the FO system 113 may act as a second system that includes in-memory storage including multiple delivery dates for different products that have been previously calculated. Alternatively, or additionally, FO system 113 may also include records of products locations and associated cutoff times for delivery options. Further, scheduling systems 320 may include front-end and a back-end portions. In such embodiments, the front-end may be configured to receive and process requests while the back-end may be configured to compute PDD or estimate delivery cutoff times. Like with FO system 113, the back-end portions of scheduling systems 320 may include multiple delivery dates for different products to minimize calculations whenever a request is similar to a previous request that has not expired.

In some embodiments, the request for delivery estimate of step 704 may be directed to a specific type of fulfillment center. For example, the product information received with the request in step 702 may be associated with a fresh product (e.g., products such as fruits, vegetables, other type of produce and/or other perishable items). If the request for product information is associated with fresh products, scheduling systems 320 may tailor the request for delivery estimate for the fresh product and send it to a specific fulfillment center. For instance, when scheduling systems 320 determine the client is requesting information for a fresh product, scheduling systems 320 may associate a customer region with the remote device and determine a fresh fulfillment center (i.e., a fulfillment center that carries fresh products) that serves the customer region. Scheduling systems 320 may then transmit the request for delivery estimate to the fresh fulfillment center.

Moreover, in some embodiments the request for delivery estimate of step 704 may be directed to a specific fulfillment center based on the fulfillment center location or capacity. For example, some requests may be associated with specific delivery types. The specific delivery types may include "Fresh" deliveries, for products that may expire quickly, or "Dawn" deliveries. Fresh and Dawn deliveries may be services for specific customer accounts that allow users to get a perishable product or receive items by dawn next day. For example, when a dawn delivery is available for a user, the delivery may be guaranteed by a predefined time, such as 7 AM. Thus, if the request for product information is associated with a dawn delivery service, scheduling systems 320 may create a specific request directed to fulfillment centers based on location.

Specific delivery types, such as fresh or dawn deliveries, may trigger a delivery process or mechanism that differ from nonspecific delivery types. For example, for dawn deliveries scheduling systems 320 may select fulfillment centers in system 300 based on a dawn cutoff time. In such embodiments, scheduling systems 320 may determine that products ordered from a fulfillment center before the dawn cutoff time can be delivered by dawn next day. Further, scheduling systems 320 may use tracking systems to determine specific cutoff times for each product based on the product time and its location in the FC. However, scheduling systems 320 may determine that products ordered from the fulfillment center after the product's or FC location cutoff time cannot be delivered by dawn. Further, fulfillment centers in system 300 may have a designed coverage area. Based on fulfillment centers dawn cut off times and coverage area, scheduling systems 320 may route the request for product information to a specific fulfillment center in step 704. For example, scheduling systems 320 may identify fulfillment centers that may accept a dawn delivery request based on the distance between the fulfillment center and the remote device. While fulfillment centers that are far away may have an early cutoff, fulfillment centers that are close may have a later cutoff. Thus, scheduling systems 320 may direct request for delivery estimate only to fulfillment centers that may complete the order by dawn in step 704.

Arranging fulfillment centers with cutoff times and service regions for dawn deliveries, may allow scheduling systems 320 to minimize network congestion when resolving dawn delivery requests. By performing determinations before transmitting requests to fulfillment center brokers, scheduling systems 320 may be able to minimize the number of communications when handling dawn deliveries, which may be highly time sensitive. Moreover, having cutoff times for specific regions in the FC and/or for specific products, allow greater level of shipping customization or fine-tuning without affecting the overall's FC workflow.

In step 706, scheduling systems 320 may receive a delivery estimate, PDD, or delivery cutoff. For example, scheduling systems 320 may receive a cutoff time for dawn delivery from FO system 113. Alternatively, scheduling systems 320 may receive the PDD from database 380 or FO system 113. Further, in embodiments where the scheduling systems 320 has a back-end calculator and a front-end gateway, the front-end portion of scheduling systems 320 may receive the calculated estimated delivery from the back-end portions. The delivery estimate or PDD received in step 706 may include an expiration or cutoff time that specifies when the order needs to be received in order to meet the PDD or have a valid predicted delivery date. This cutoff time may be determined based on the position of the product within the FC as determined by, for example, item positioning system 390 (FIG. 3). Thus, the estimated delivery may include a conditional expiration or cutoff time for each product that specifies when is the deadline to guarantee the delivery of the product.

In step 708, scheduling systems 320 may generate an electronic message including the estimated delivery date or the cutoff time for a delivery option. The electronic message may be formatted specifically for the remote systems that generated the query in step 702. For example, scheduling systems 320 may generate an electronic message for client devices 350 when they request the product information. The electronic message may include a TCP/IP message, SMS message, or other similar electronic communications. The electronic message generated in step 708 may include an HTML File or JavaScript with product information and delivery information, as further described in connection to FIG. 16. In some embodiments, the HTML file may include the product information, the delivery date estimate, and instructions to modify the webpage. In such embodiments, the modification instructions may include identifying the webpage's type (the webpage's type being one of a search result page, a single detail page, a cart page, or an order page) and modifying the webpage based on the webpage's type.

Moreover, the electronic message of step 708 may specify instructions to generate or modify a webpage in the remote device. In some embodiments, the HTML File or JavaScript may be configurable to modify webpages instead generating a new one. For example, when a user of client devices 350 is browsing a webpage that displays products, like described in FIG. 1B, the electronic message may include instructions to modify the webpage; instead of sending updated versions of the webpage as estimated deliveries are computed. Such embodiments may improve the technical field of generating dynamic webpages by minimizing network congestion. Moreover, in some embodiments the instructions to modify the website may include modifying product icons to include fresh, dawn, first-time delivery, or non-fresh dawn indicators based on the product information.

In step 710, scheduling systems 320 may transmit the electronic message of step 708 to the remote device. For example, the HTML or JavaScript files generated in step 708 may be transmitted to client devices 350 when client devices 350 request the product information. In embodiments that employ dawn delivery options, scheduling systems 320 may perform specific instructions to communicate with users in step 710. For example, when a user of client devices 350 is set to receive a dawn delivery, scheduling systems 320 may activate two settings. First, scheduling systems 320 may identify products going to be delivered by dawn and issue a promise of dawn delivery, for example delivery by 7 AM. Further, scheduling systems 320 may modify graphical user interfaces, as further described in connection with FIG. 12, to indicate the dawn delivery promise. Second, when fulfilling dawn deliveries, scheduling systems 320 may program a messaging service (such as Google Cloud Messaging (GCM) or Apple Push Notification service (APNs)) to send a push notification at a predefined time to customers. In such embodiments, scheduling systems 320 may program push notifications to include delivery info, photos of the delivered package, and/or data associated with delivery. Further, scheduling systems 320 may program and generate push/text notifications based on user preferences that can be set during checkout. For example, a user may select the time of the push notification, or whether the user wants an SMS in addition to the push notification. An alternative user selection may include receiving both push notifications and SMS immediately after the package is delivered, even if the delivery is scheduled at, for example, 4 AM.

In step 712, scheduling systems 320 may receive an acknowledgement. For example, scheduling systems 320 may receive an acknowledgement from client devices 350 that the electronic message was received. Further, based on receiving the acknowledgement, scheduling systems 320 may initiate a timer based on the cutoff time associated with the product time. With this configuration, scheduling systems 320 may save resources on the number of timers that need to be employed to monitor expiration of estimated delivery dates. Instead of immediately starting timers for estimated delivery dates or PDDs, scheduling systems 320 may minimize utilization of computational resources by only initiating timers when client devices 350 acknowledge they received and/or displayed the estimated delivery.

In step 714, scheduling systems 320 may determine whether an order for a product has been received. For example, scheduling systems 320 may review order requests in order data streams to determine if the customer associated with the remote device has completed the order. If scheduling systems 320 determine an order has been received (step 714: Yes), scheduling systems 320 may continue to step 716 an initiate a fulfillment process. Thus, scheduling systems 320 may send instructions to a one or more FCs shipping zone to ship the product or initiate the process to fulfill the order. For example, scheduling systems 320 may engage with SAT system 101 to begin processing the order.

However, if scheduling systems 320 determine an order has not been received (step 714: No), scheduling systems 320 may continue to step 718. In step 718, scheduling systems 320 may determine whether the time has expired or that the cutoff passed. For example, if the delivery estimate received in step 706 was associated with an expiration time of one hour, in step 718 scheduling systems 320 may determine whether an hour has lapsed since the delivery estimate was received. Similarly, if the cutoff assigned for the product in the FC is 4 PM, in step 718 scheduling systems 320 may determine whether the order was received after 4 PM. If scheduling systems 320 determine that the expiration time has not lapsed (step 718: No), scheduling systems 320 may return to step 714 and continue monitoring whether an order has been received for the product and cycle between steps 714 and step 718. However, if scheduling systems 320 determine the expiration time lapsed (step 718: Yes), scheduling systems 320 may continue to step 720 and send a new request for updated delivery estimate. For example, scheduling systems 320 may send a request for updated delivery estimates to the fulfillment centers or to a back-end portion of the scheduling systems 320.

In some embodiments, requesting an updated PDD or cutoff time estimate in step 720 may include identifying FCs based on the remote device information, requesting available inventory from identified FCs, and selecting an FC from the identified fulfillment centers based on a match between corresponding available inventory and the product identification.

In step 722, scheduling systems 320 may receive an updated delivery estimate from fulfillment center or back-end calculator portion of the system. For example, because the cutoff time lapsed or the PDD estimate expired, scheduling systems 320 may receive an updated cutoff time for a different delivery type or PDD that is later than the first delivery estimate received in step 706. If the initial delivery estimate was "Monday at 20:00" the second delivery estimate may be "Tuesday at 10:00." If the earliest cutoff time was "4 PM for dawn delivery," the later cutoff time may be "8 PM for before lunch delivery." This second delivery or cutoff may also include an expiration time. Nevertheless, in some situations the second delivery estimate received in step 722 may be the same but include an updated expiration time.

In some embodiments, steps 720 and 722 may be executed by performing operations of determining the estimate expiration for the first delivery estimate lapsed, providing (to a second system such as FO systems 113) a third request for a second delivery date estimate, receiving (from the second system) the second delivery date estimate, and generating a second electronic message with instructions to modify the webpage by substituting the first delivery date estimate with the second delivery date estimate.

In step 724, like in step 712, scheduling systems 320 may receive an acknowledgement and initiate a timer based on the new expiration time. Moreover, scheduling systems 320 may return to step 714 to monitor the order, cutoff times for specific products, and delivery date estimates to initiate fulfillment process or request, again, an update for the delivery estimate when the expiration lapses.

Figure 8:
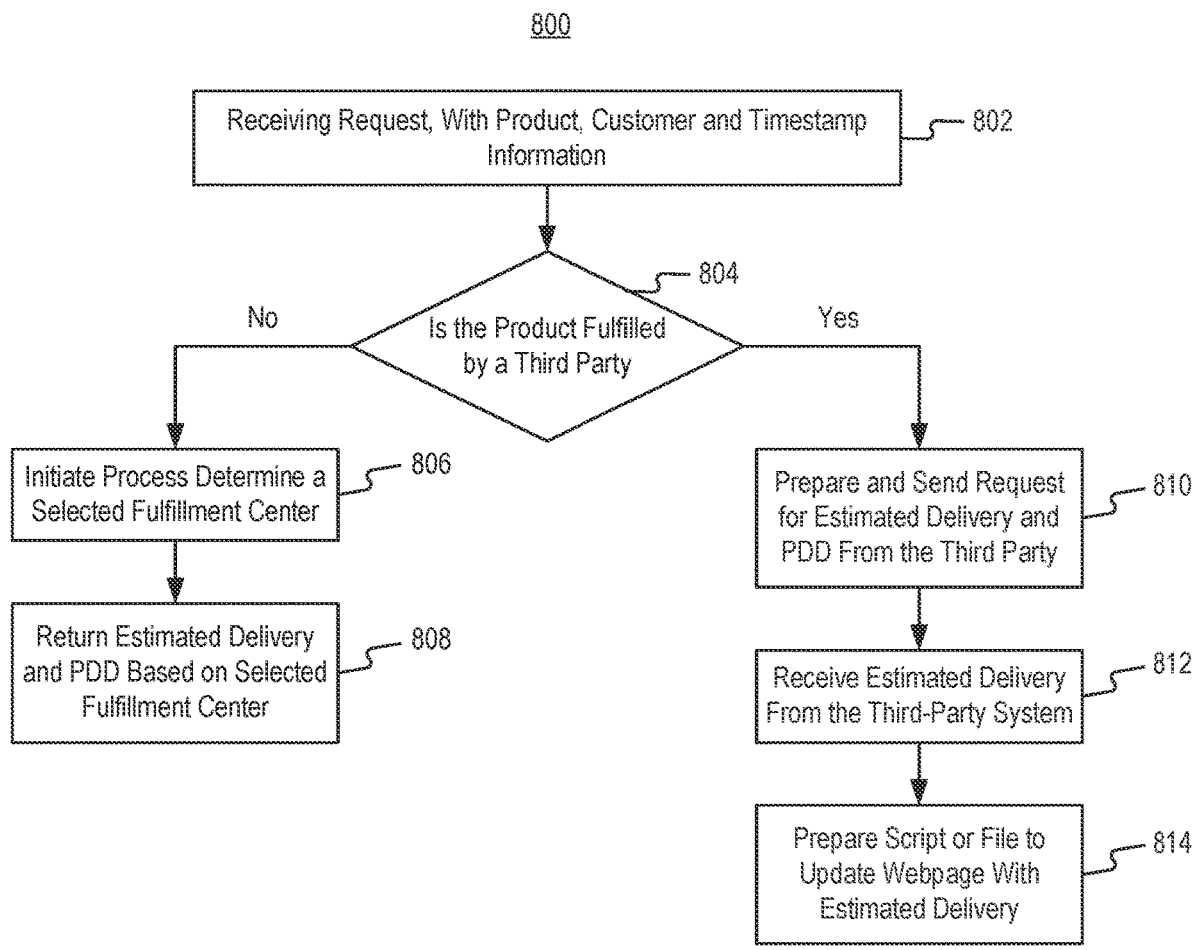
FIG. 8 is a flow chart of an exemplary process for handling estimate requests of products fulfilled by third parties, consistent with disclosed embodiments.

FIG. 8 is a flow chart of an exemplary process 800 for handling estimate requests of products fulfilled by third parties, consistent with disclosed embodiments. In some embodiments, elements of system 300 may perform process 800. For example, as disclosed in the steps description below, scheduling systems 320 may perform process 800. Alternatively, or additionally, third-party systems 360 may perform process 800, or parts of process 800. Further, in other embodiments system 100, or parts of system 100, may perform process 800. For instance, FO system 113 and 3PL systems 121 may perform process 800.

In step 802 of process 800, scheduling systems 320 may receive a request for product information including product, customer, and timestamp information. For example, scheduling systems 320 may receive a request for product information from client devices 350. The request may also include customer information, such as a postal code, and a timestamp of when the request was generated.

In step 804, scheduling systems 320 may determine whether the product would be fulfilled by a third party. For example, scheduling systems 320 may determine the product is unavailable in local inventory and would need to be fulfilled by a third party. Alternatively, scheduling systems 320 may determine the product is normally fulfilled by third parties by default, without requiring an inventory query.

If scheduling systems 320 determine the product is not fulfilled by a third party (step 804: No), scheduling systems 320 may continue to step 806 and initiate the process to determine a selected fulfillment center. For example, as further described in connection to FIG. 9, based on the postal code of the customer, product availability, and fulfillment center capacity, scheduling systems 320 may identify a fulfillment center that has a priority to complete an order. In step 808, scheduling systems 320 may send an estimated delivery and cutoff time based on the selected FC. For example, once a FC is identified in step 806, scheduling systems 320 may request a product location within the FC, determine a delivery date estimate, and send it to client devices 350 for display to customers.

However, if scheduling systems 320 determine the product is fulfilled by a third party (step 804: Yes), scheduling systems 320 may continue to step 810 and prepare a request for estimated delivery or PDD from the third party. For example, in step 810 scheduling systems 320 may prepare and send a request for PDD to third-party systems 360 or 3PL systems 121. The request sent to the third party may include the product information and customer information (e.g., customer's postal code).

In step 812, scheduling systems 320 may receive the estimated delivery date from third parties that may fulfill an order for the product requested in step 802. For instance, scheduling systems 320 may receive a PDD and delivery estimate information from one of third-party systems 360. Further, in step 812 scheduling systems 320 may receive a cutoff time that depends on the positioning of the requested item within the third party facilities.

In step 814, scheduling systems 320 may prepare an electronic message including a JavaScript or HTML file to update or generate webpages including the estimated delivery date and/or time. The electronic message may then be submitted to the requester of product information in step 802.

Steps in process 800 may be stored in a memory device of scheduling systems 320, which may include instructions to determine, by consulting a database (such as databases 180), whether delivery of the product will be fulfilled by a third party. Scheduling systems 320 may also, based on determining that the delivery of the product will be fulfilled by a third party, provide the request for a delivery date estimate to a system associated with the third party. Further, based on determining that the delivery of the product will not be fulfilled by a third party, scheduling systems 320 may provide the request for a delivery date estimate to a system that pre-stores a plurality of delivery date estimates in memory.

Figure 9:
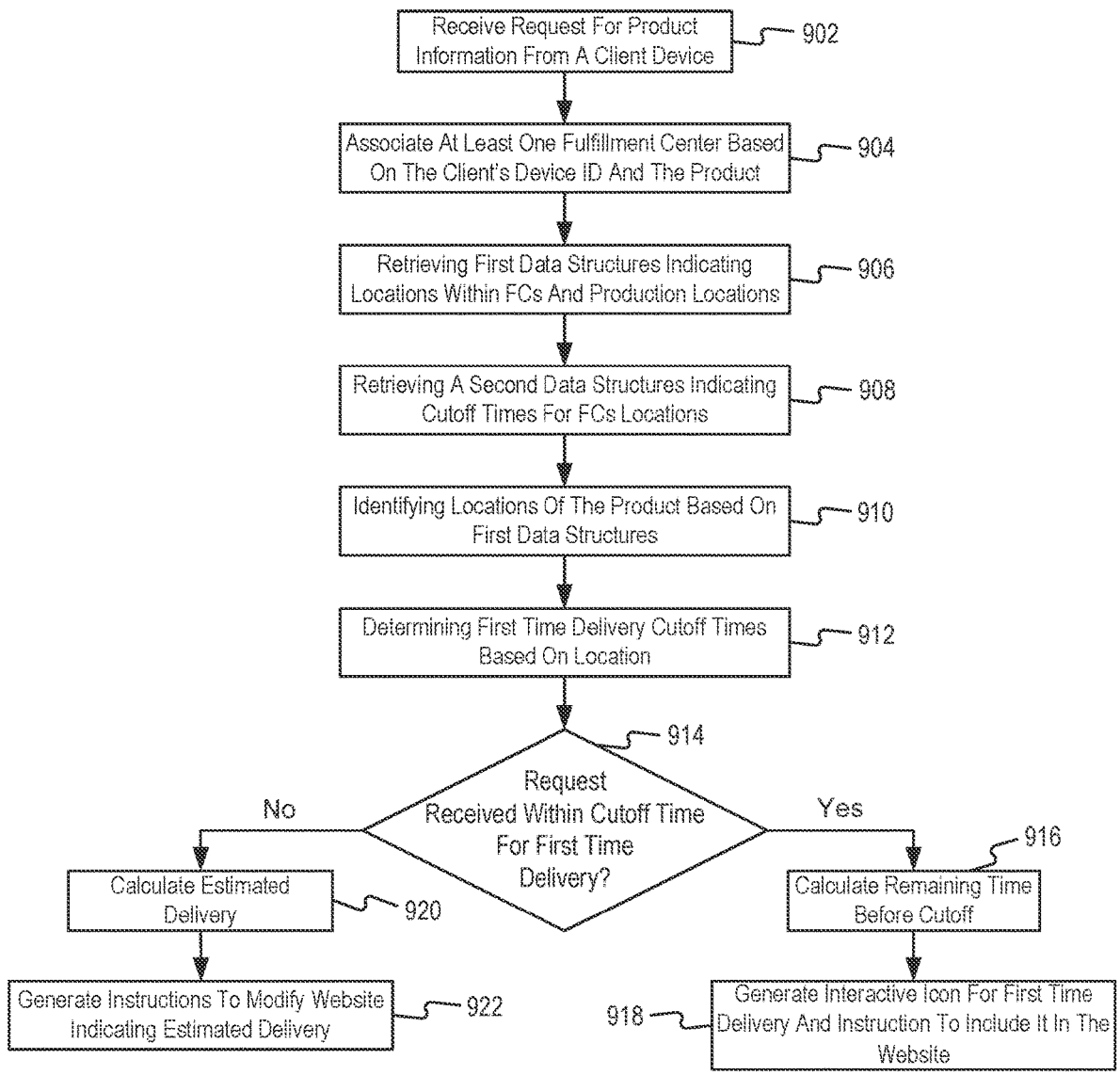
FIG. 9 is a flow chart of a retail website modification process, consistent with disclosed embodiments

FIG. 9 is a flow chart of a retail website modification process 900, consistent with disclosed embodiments. In some embodiments, elements of system 300 may perform process 900. For example, as disclosed in the steps description below, scheduling systems 320 may perform process 900. However, in other embodiments system 100, or parts of system 100, may perform process 900. For example, FO System 113 and/or FC Auth 123 (FIG. 1A) may perform one or more of the steps in process 900.

In step 902, scheduling systems 320 may receive a request for product information from a client device. The request may include product, time, and postal code information. Based on the information in the request, scheduling systems 320 may identify relevant geographical regions in step 904 to associate at least one fulfillment center based on the client's device id and the product. For example, scheduling systems 320 may identify regions that may fulfill a potential order for the product based on the customer's postal code. Alternatively, or additionally, scheduling systems 320 may identify FCs that are capable of fulfilling orders under specific delivery options, such as dawn delivery.

In step 906, scheduling systems 320 may retrieve first data structures indicating locations within FCs and production locations. For example, scheduling systems 320 may query servers or databases that include FC information to retrieve data structures that include information of the specific position or location of the requested products withing the FC identified in step 904. The data structures may include matrixes, arrays, tables, or maps. Further the data structures may also be implemented with resizable arrays of multi-type variables (depending on the language, individual elements may either all be forced to be the same type or may be of almost any type). Moreover, the data structures may include linked lists with a linear collection of data elements of any type, called nodes, where each node has itself a value, and points to the next node in the linked list. The data structures may also include records (also called tuples or structs), unions (a data structure that specifies which of a number of permitted primitive types may be stored in its instances), or a tagged union (also called variant). Further, the data structures may include objects, an in-memory instance of a class from a taxonomy.

In step 908, scheduling systems 320 may retrieve one or more second data structures, which may indicate cutoff times for FCs locations. The second data structures may be implemented like the first data structures. That is, second data structures may also be implemented with, for example, arrays, matrices, lists, or unions. However, unlike the first data structures, the second data structures may not have information about the product in the FC, but information about cutoff times for deliveries based on locations in the FC. For example, as further described in connection to FIG. 14, FCs may be divided in virtual regions each region having its own cutoff time for certain delivery methods. For example, FCs may be divided in multiple zones with different cutoff times for dawn deliveries. The second data structure of step 908 may specify this information.

In step 910, scheduling systems 320 may identify locations of the product based on first data structures. For example, scheduling systems 320 may determine a location of the requested product by searching entries in the first data structure that match the requested location. In step 912, scheduling systems 320 may determine cutoff times based on the location of products by correlating the product location with the cutoff times stored in the second data structure. For example, scheduling systems 320 may determine first time delivery cutoff times based on location retrieved from the first data structures by correlating the location with a cutoff time in the second data structure.

In step 914, scheduling systems 320 may determine whether the request of step 902 was received within cutoff time for a specific delivery. For example, scheduling systems 320 may determine whether the product request was received before the cutoff time for a first time delivery by comparing the cutoff time retrieved form the second data structure and the time stamp in the received order.

If scheduling systems 320 determine that the request was delivered before the cutoff time (step 914: Yes), scheduling systems 320 may continue to step 916. In step 916, scheduling systems 320 may calculate remaining time before the cutoff. For example, if the cutoff time is 4 PM and the request was received at 2 PM, scheduling systems 320 may calculate a remaining time before the cutoff of 2 hours. Further, scheduling system 320 may continue to step 918 and generate an interactive icon for first time delivery. In step 918 scheduling system 320 may also generate instructions to include the remaining time before the cutoff in the website. For example, when requests are generated by client devices, scheduling system 320 may, determine a fulfillment center and associated physical location for the product and send cutoff times associated with the physical location to the system for displaying web pages. Hence, in some embodiments, each cutoff time may be inversely proportional to respective ones of the calculated distance for each of the associated physical locations.

If, however, scheduling systems 320 determine that the request was not received before the cutoff time (step 914: No), scheduling systems 320 may continue to step 920. In step 920, scheduling systems 320 may calculate estimated delivery for a standard delivery. For example, using a PDD determination process, as further described in connection to FIG. 7, scheduling systems 320 may calculate an estimated delivery for the product under standard shipping. Further, scheduling systems 320 may also generate instructions to modify website indicating estimated delivery in step 922.

For example, scheduling system 320 may generate HTML or JavaScripts to display the available delivery options, respective cutoff times, and respective icons for the delivery types.

Figure 10:
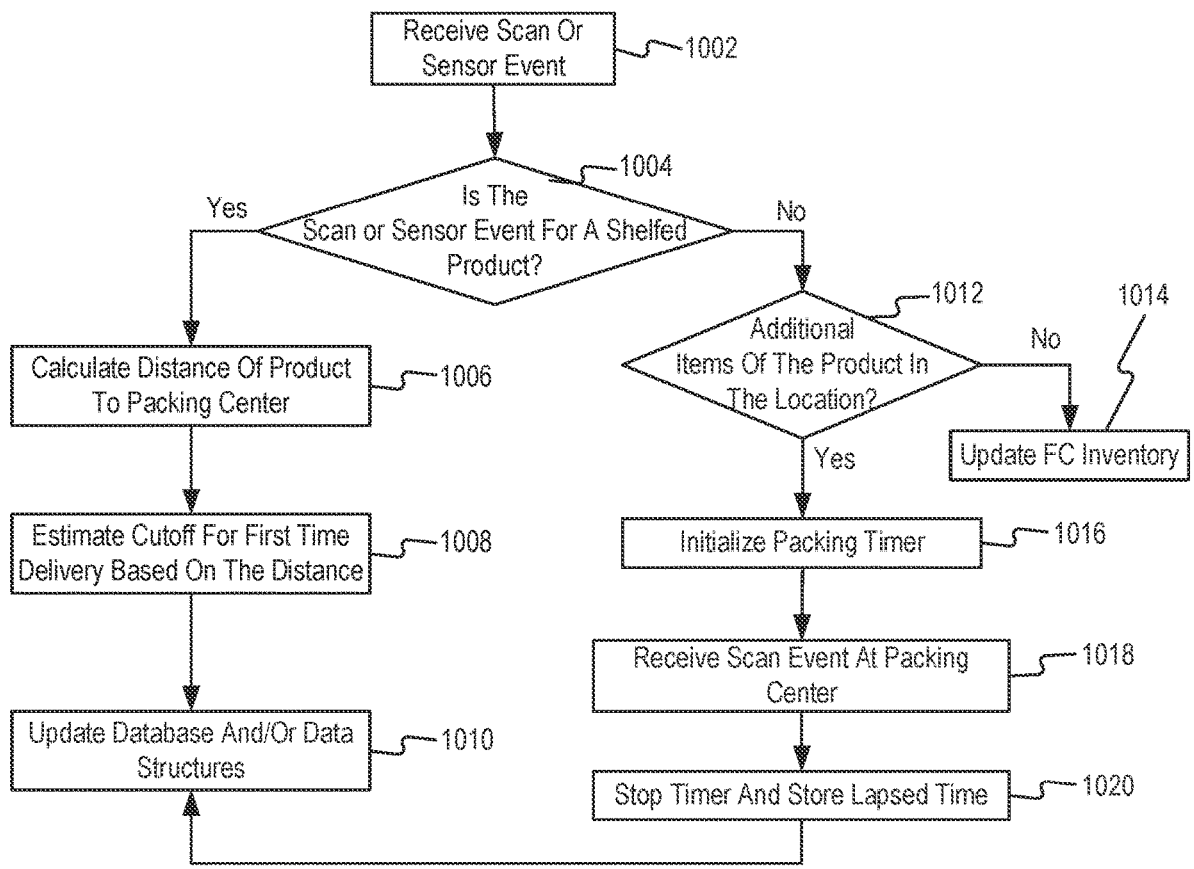
FIG. 10 is a process flow diagram of an exemplary product location identification process, consistent with disclosed embodiments.

FIG. 10 is a process flow diagram of an exemplary product location identification process 1000, consistent with disclosed embodiments. Process 1000 may be performed by system 300, or parts of system 300. For example, as described below scheduling systems 320 may perform process 1000. This is just an illustrative example of process 1000, however, and in other embodiments system 100, or parts of system 100, may perform process 1000. For example, Shipment Authority Technology System 101, FO System 113, and/or order tracking system 111 (FIG. 1A) may perform one or more of the steps in process 1000.

In step 1002, scheduling systems 320 may receive a scan or sensor event. For example, scheduling systems 320 may receive a signal from sensors 217A-217C (FIG. 2) indicating that a product was placed or removed from a shelf. Alternatively, or additionally, scheduling systems 320 may receive a notification that a product has been scanned in the picking zone triggering the product positioning system. Moreover, in step 1002 scheduling systems 320 may receive an electronic message from item positioning system 390 (FIG. 3) indicating a product was relocated within an FC. The electronic message may be generated when with the scan event and/or the sensor event.

In step 1004, scheduling systems 320 may determine whether the scan or sensor event is associated with the shelving of a product. For example, scheduling systems 320 may determine whether a sensor got triggered because a product was placed in the shelf or because a new pallet was placed in the picking zone. If scheduling systems 320 determine that the scan or sensor event is associated with shelving a product (step 1004: Yes), scheduling systems 320 may continue to step 1006, in which scheduling systems 320 may calculate a distance of product to the packing center. The distance calculated in step 1006 may be a physical distance (a distance in meters from product's location to the packing center). However, the calculated distance or distance score may be an equivalent distance measured in units different from length. For example, the calculated distance may be expressed in time and in step 1006 scheduling system may calculate a distance in minutes from the product to the packing center. Alternatively, or additionally, the distance between the product and the packing center may be determined in arbitrary units that include, for example, a unit that combines physical distance and travel time. When calculating the distance between the product and the packing center, scheduling systems 320 may take into account the floor in which the product is located, availability of elevators or conveyer belts, number of employees in the location of the product, among other factors.

In step 1008, scheduling systems 320 may estimate cutoff for first time delivery based on the distance. For example, if the calculated distance is long, the distance may indicate the product is far away from the packing center or that it is difficult to take the product from the shelf to the packing center (e.g., there are not enough employees and there are delays in bringing products to packing centers). Thus, the cutoff time for first time delivery may need to be early to guarantee that the product will be delivered to the packing center on time. Alternatively, if the calculated distance is short, the distance may indicate that the product is close to the packing center and the FC may afford to wait until later for first time deliveries (i.e., have a later cutoff time). Using a distance to packing center to determine cutoff times for each product or location in the FC allows a greater level of specificity that enables providing first time deliveries for longer and later cutoffs. Thus, the determination of distances for packing centers facilitates creating workflows for shipping and improve computerized scheduling.

In step 1010, scheduling systems 320 may update database and/or data structures. For example, scheduling systems 320 may update database 380 to store the cutoff calculated for the location identified in step 1008. Further, scheduling systems 320 may update the database of inventory and product locations based on the information received in steps 1006-1008. In some embodiments, scheduling systems 320 may update the first data structure of step 906 which includes FC virtual zones and the product locations within the FC.

If in step 1004 scheduling systems 320 determine that the scan or sensor event is not associated with shelving a product (step 1004: No), scheduling systems 320 may infer that the even was triggered by a removed item and continue to step 1012.

In step 1012, scheduling systems 320 may determine whether additional items remain in the same shelf. For example, using sensors data or image recognition techniques, scheduling systems 320 may determine whether additional items of the same product remain in the shelf. Alternatively, or additionally, in step 1012 scheduling systems 320 may retrieve inventory information from an FC server and determine whether additional elements remain in the shelf. Furthermore, scheduling systems 320 may determine whether additional items remain in the shelf using sensors, like wireless BLE sensors, weight sensors, and/or RFID tags.

If scheduling systems 320 determine that additional items do not remain in the same shelf (step 1012: No), scheduling systems 320 may continue to step 1014 and update the FC inventory. In some embodiments, updating the FC inventory may include re determining the cutoff time for first time delivery associated with the product. Because the product is no longer available in the location that was used for the cutoff time determination, in step 1014 scheduling systems 1014 may update first data structures (to indicate the product is no longer available in the previously store location) and the second data structure (to indicate the product should no longer be associated with previously computed cutoff time).

However, if scheduling systems 320 determine that additional items remain in the same shelf (step 1012: Yes), scheduling systems 320 may continue to step 1016.

In step 1016, scheduling systems 320 may initialize a packing timer. With the goal to have more precise information about travel times between shelfs and packing centers, scheduling system 320 may initialize a timer once a product is removed from the shelf. This information may be used to train predictive algorithms that determine the distance described in step 1008. For example, times between shelfs and packing centers may be used to train a machine-learning algorithm that use Random Forest or Non-Linear Regressions to determine or adjust the distance that is used to estimate travel times between shelfs and packing centers and, in turn, fine tune the cutoff times.

In step 1018, scheduling systems 320 may receive scan event at packing center. This may occur when the product that triggered the event in step 1002 is delivered in the packing center. Thus, in step 1020, scheduling systems 320 may stop timer and store lapsed time. This lapsed time is the actual travel time between shelf and packing center and may be used to fine tune cutoff time for the location and product.

In some embodiments, after stopping the timer in step 1020, scheduling system 320 may return to step 1010 and update database and/or data structures. For example, scheduling systems 320 may update the second data structure to update the cutoff time associated with a region based on the measured travel time.

Figure 11:
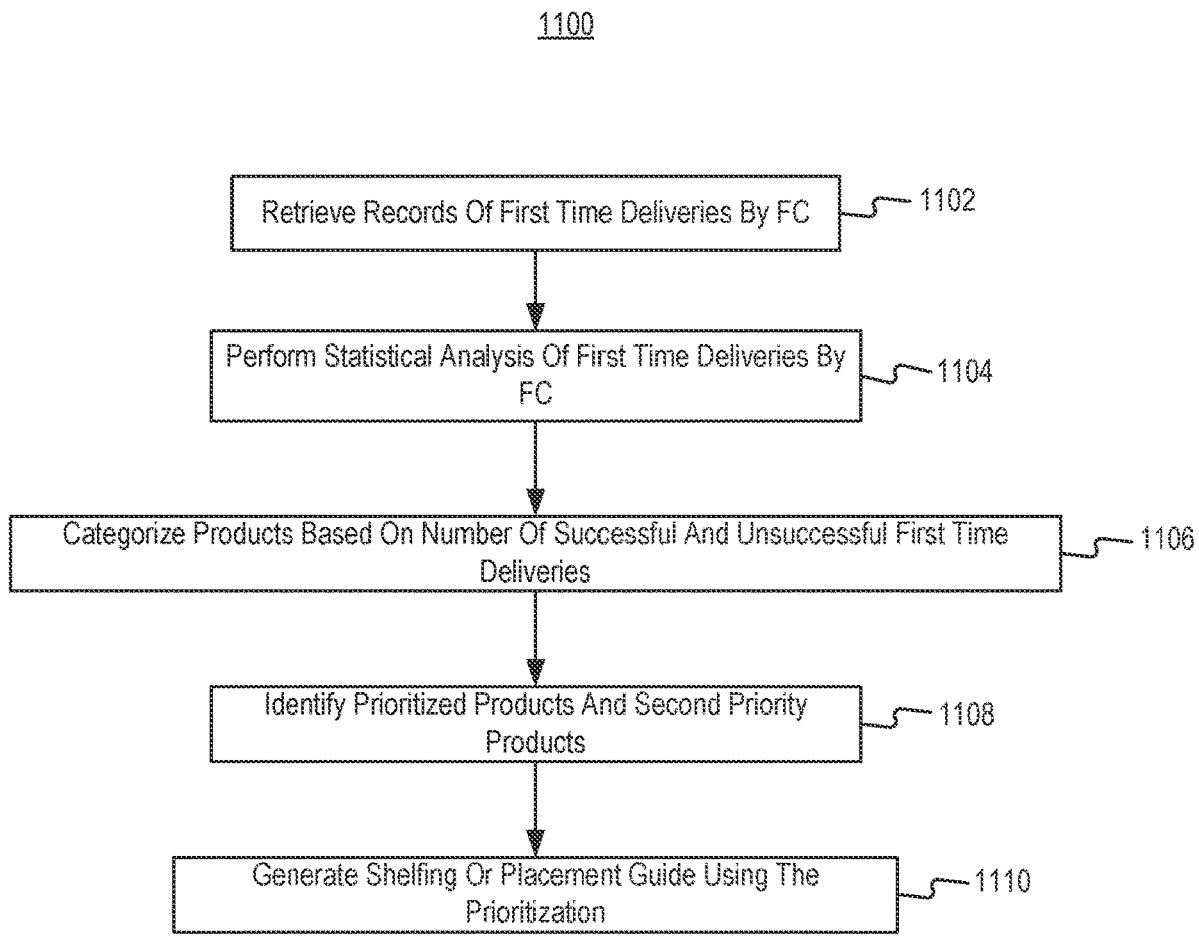
FIG. 11 is a flow chart of a placement guide generation process, consistent with disclosed embodiments.

FIG. 11 is a flow chart of a placement guide generation process 1100, consistent with disclosed embodiments. In some embodiments, elements of system 300 may perform process 1100. For example, as disclosed in the steps description below, scheduling systems 320 may perform process 1100. However, in other embodiments system 100, or parts of system 100, may perform process 1100. For example, FO System 113 and/or FC Auth 123 (FIG. 1A) may perform one or more of the steps in process 1100.

In step 1102, scheduling systems 320 may retrieve records of first time deliveries by FC. For example, scheduling systems 320 may query database 380 to obtain records of first time deliveries by an FC. The records may include order time, item description, time to packing center, and successful or unsuccessful first time delivery.

In step 1104, scheduling systems 320 may perform statistical analysis of first time deliveries by FC. The statistical analysis may include a model summarizing relationships between data and underlying population, averages analysis, predictive analysis, and/or event frequency analysis. For example, scheduling systems 320 may determine the products that are most commonly ordered for first time delivery or the products that normally have unsuccessful first time deliveries. Further, the statistical analysis may determine which products take longer to go from shelfs to packing center.

In step 1106, scheduling systems 320 may categorize products based on number of successful and unsuccessful first time deliveries. For example, based on the statistical analysis of step 1104, scheduling systems 320 may identify the product that is more frequently requested for first time delivery. Further, based on the statistical analysis, scheduling systems 320 may identify products that are frequently requested for first time delivery but are not successfully delivered because it is unable to meet the cutoff.

In step 1108, scheduling systems 320 may identify prioritized products and second priority products. For example, scheduling systems 320 may determine that categories of step 1106 associated with multiple unsuccessful deliveries should be prioritized to prevent future unsuccessful deliveries. Alternatively, or additionally, scheduling systems 320 may identify products that are frequently requested for first time delivery as prioritize products to facilitate work flows in the FC for first time deliveries. In contrast, products that are not frequently requested for first time delivery may be categorized as low priority.

In step 1110, scheduling systems 320 may generate shelving or placement guides using the prioritization. For example, scheduling systems 320 may generate a shelving guide in which products classified as low priority can be placed further away from the packing center then products classified as high priority. The shelving or placement guide may use the calculated distance of step 1006 (FIG. 10) to guide the selection of where products should be stowed in the FC based on the priorities. Thus, in some embodiments, scheduling systems 320 may retrieve first and second data structures to determine distances of locations of the FC with the packing center. For example, from the first data structure scheduling systems 320 may determine the location of products within the FC. Then scheduling systems 320 may determine distance from locations to packing center from the second data structures. Correlating information from the first and second data structure scheduling systems may determine the distances of FC locations to the packing center. With this information, scheduling systems 320 may generate a shelving or placement guide for workers of an FC. The guide may be configurable to be displayed in devices of workers and/or machines in hub zone 213 (FIG. 2).

Figure 12:
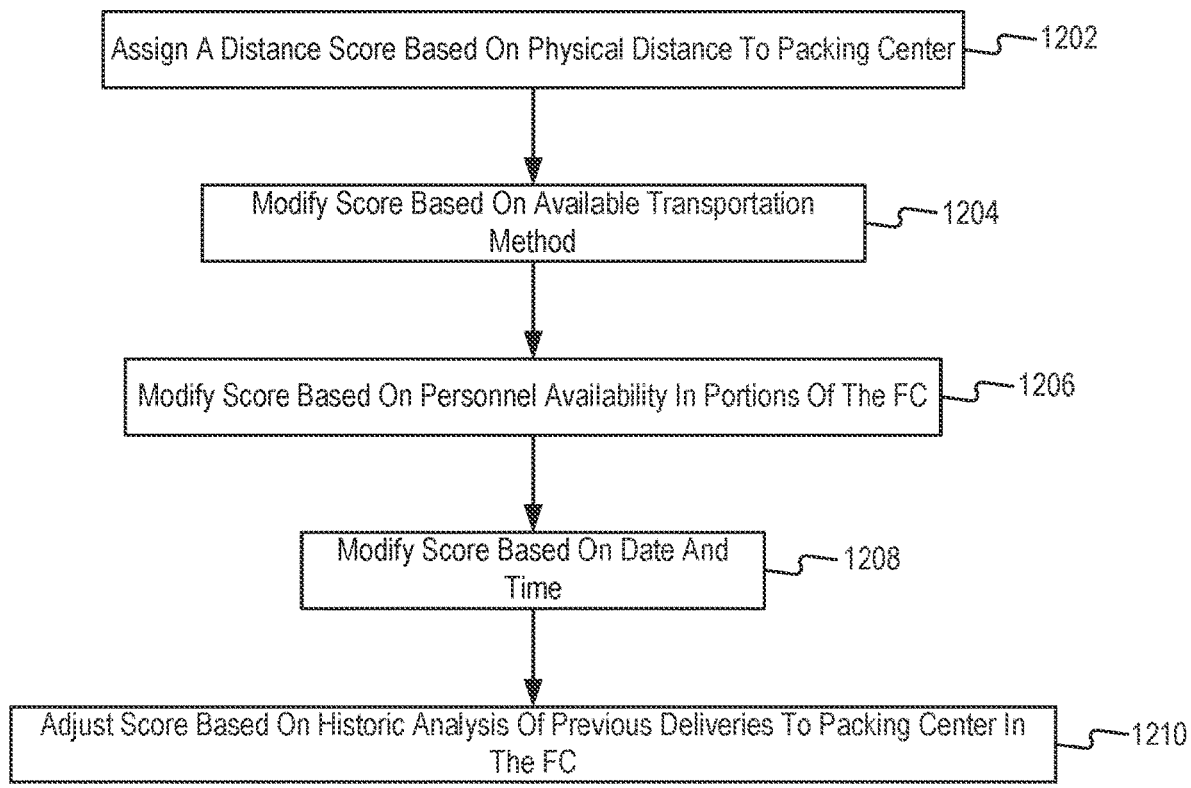
FIG. 12 is a flow chart of a distance score calculation process, consistent with disclosed embodiments.

FIG. 12 is a flow chart of a distance score calculation process 1200, consistent with disclosed embodiments. In some embodiments, elements of system 300 may perform process 1200. For example, as described below scheduling systems 320 may perform process 1200. However, in other embodiments system 100, or parts of system 100, may perform process 1200. For example, FO System 113 and/or FC Auth 123 (FIG. 1A) may perform one or more of the steps in process 1200.

In some embodiments, process 1200 may allow systems 100 or 300 to determine a distance score that indicates travel time, physical distance, and/or overall required time to transport packages from specific locations of an FC to a packing center.

In step 1202, scheduling systems 320 may initialize process 1200 by assigning a distance score based on physical distance to packing center. For example, current FC's normally have multiple floors and large layouts. Particularly FCs that are located in high population density areas may spread multiple products in several locations and levels within the FC. Thus, in step 1202 scheduling systems 320 may assign a distance score based on a physical distance to a packing center in the FC. For example, scheduling systems 320 may assign a score where one score point represents one meter of distance between the physical distance to the packing center. Alternatively, or additionally, scheduling systems 320 may assign a number of points (e.g., 10 points) to the distance score when the physical location is in a different level than the packing center. Overall, if the physical distance is long, scheduling systems 320 may assign a high distance score, indicating that it will take a long time to transport the product from the location in the FC to the packing area. However, if the physical distance is short (e.g., the product is in a location nearby the packing center), scheduling systems 320 may assign a low distance score, indicating that it will not take a long time to transport the product from the location in the FC to the packing area.

In step 1204, scheduling systems 320 may modify the estimated distance score based on available transportation methods. For example, if conveyor belts are available between the location of the product and the packing center. The score may be reduced to a lower score to indicate that, even if the location is far away from the packing center, the product or item may nonetheless arrive quickly to the packing center through the conveyor belt. For example, the distance score assigned in step 1202 may be multiplied by ½×, ⅓×, and/or ⅚× to take into account the availability of a transportation system. If, however, the product can only be transported by a worker, the distance score may get increased to indicate that the transportation method may cause delays. For example, the distance score assigned in step 1202 may be multiplied by 2×, 3×, and/or 5× to take into account the unavailability of a transportation system Similarly, scheduling systems 320 may include availability of elevators, automated packages delivery, or transportation method congestion when modifying the estimated distance score in step 1204.

In step 1206, scheduling systems 320 may modify the estimated distance score based on personnel availability in portions of the FC. Delivery of products may be limited by the availability of personnel in the location of the product. Regardless of the transportation velocity or the distance between the location and the packing center, if there are no workers available to select and distribute the product, the time required to transport the product or item to a packaging center may be high. Thus, in step 1206 scheduling systems 320 may modify the distance score based on personnel availability. For example, scheduling systems 320 may review LMB 115 (FIG. 1) records to determine availability of employees in a certain zone and at a certain time. If scheduling systems 320 determines that only a few employees are available in the product's zone, scheduling systems 320 may increase the distance score because it is likely the product will take a long time to reach the packing center. In some embodiments, scheduling systems 320 may increase the score number of points that is inverse to the number of workers. For example, scheduling systems 320 may increase the score by 10 points for each employee below 10 employees in the FC. However, if scheduling systems 320 determines that many employees are available in the product's zone, scheduling systems 320 may decrease the distance score. For example, scheduling systems 320 may decrease the score by 10 points for each employee above 20 employees in the FC In step 1208, scheduling systems 320 may modify the distance score based on date and time of orders. In some embodiments, scheduling systems 320 may include date and time of orders in the computation of the distance score. Based on historic of order density, retrieved for example from SAT 101, scheduling systems 320 may predict dates and times when the FC is busy (i.e., fulfilling multiple orders) and dates and times when the FC is not busy (i.e., low density of orders). In such embodiments, scheduling systems 320 may adjust the order delivery to account for date and time. In some embodiments, scheduling systems 320 may increase the score number of points proportionally with the density of orders at the specific date. For example, scheduling systems 320 may increase the score by one point for each 100 orders per minute. Thus, if for the date and time there are 1000 orders per minute, scheduling systems 320 may add 10 points to the score. For example, for dates and times when the FC is generally busy, with a high density of orders, scheduling systems 320 may increase the distance score because the likelihood of delays in a busy FC is higher. In contrast, for dates and times when the FC is generally not busy, scheduling systems 320 may decrease the distance score. In some embodiments, the score may also be adjusted down if the density of orders is below the FC normal capacity. For example, if the FC has the capacity to handle 100 orders per minute, scheduling system 320 may reduce the score when the FC has an order density of less than 100 orders per minute.

In step 1210, scheduling systems 320 may adjust the distance score based on historic analysis of previous deliveries to packing center in the FC. During process 1200 scheduling systems 320 may query databases to determine historic trends or averages of travel time between product locations and packing centers. For instance, scheduling systems 320 may retrieve information of the timers of step 1016 to adjust the distance score of the location based on previous deliveries. Based on the historic information, scheduling systems 320 may adjust the score. For example, scheduling systems 320 may compare scores of different locations and their measured travel times in historic records. In such embodiments, scheduling systems 320 may decrease the distance score when historic information of travel time indicates that the location frequently delivers faster than their peers (i.e., similar distanced location). Alternatively, if the historic information indicates that the location delivers later than peers, scheduling systems 320 may adjust up the score.

Process 1200 describes a process with an initial assignment and multiple score modifications and adjustments. This is an exemplary embodiments and steps 1204-1210 are optional. Thus, in some embodiments, only some of the modifications of process 1200 may be performed. For example, some embodiments may not perform steps 1204 and/or 1206. Alternatively, or additionally, process 1200 may be limited only to steps 1202 and 1204.

In some embodiments, scheduling system 320 perform process 1200 using scan events from employee devices. For example, scheduling system 320 may receive, from a first employee device, a first scan event including an identifier associated with a first physical location stored in the first data structure. Further, as part of process 1200, scheduling system 320 may receive, from a second device, a second scan event specifying a product identifier associated with the requested product and determine a time period based on the first scan event and the second scan event. In such embodiments, scheduling systems 320 may modify, based on the determined time period, the cutoff time associated with the portion containing the first physical location in a first data structure.

Additionally, or alternatively, scheduling system 320 may analyze a plurality of first scan events and a plurality of second scan events during process 1200. In such embodiments, scheduling system 320 may calculate or modify the distance score based on the plurality of first scan events (such as de-shelving products) and the plurality of second scan events (such as scanning at the packaging center).

Figure 13:
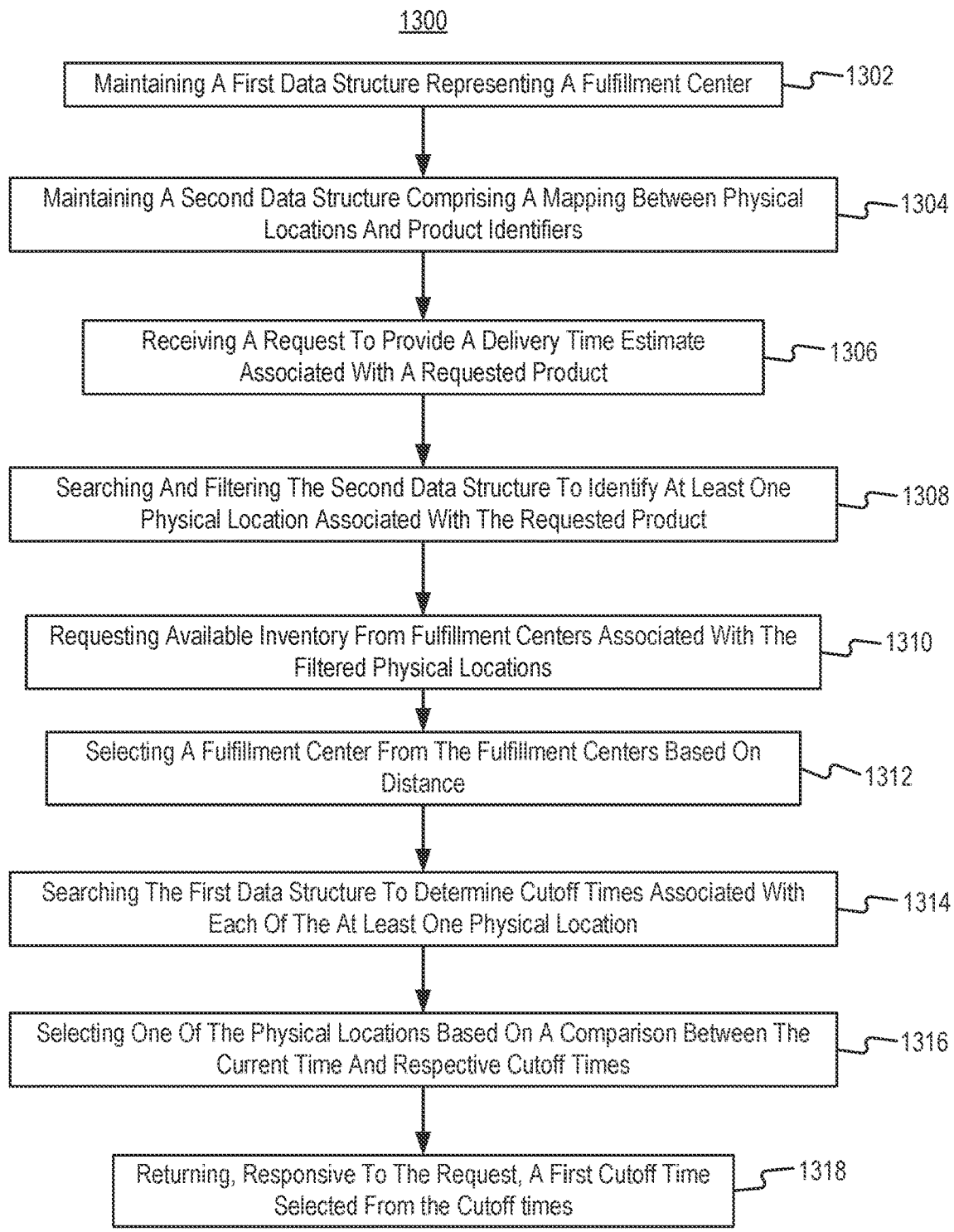
FIG. 13 is a flow chart of an exemplary cutoff time determination process, consistent with disclosed embodiments.

FIG. 13 is a flow chart of an exemplary cutoff time determination process 1300, consistent with disclosed embodiments. In some embodiments, elements of system 300 may perform process 1300. For example, as disclosed in the description below, scheduling systems 320 may perform process 1300. This is just an illustrative example of process 1300, however, and in other embodiments system 100, or parts of system 100, may perform process 1300. For example, Shipment Authority Technology System 101, FO System 113, and/or order tracking system 111 (FIG. 1A) may perform one or more of the steps in process 1300.

In step 1302, scheduling systems 320 may maintain a first data structure representing a fulfillment center. For example, scheduling systems 320 may store and update a first data structure that includes zones of a fulfillment center and the product location with respect to the zones in the fulfillment center.

In step 1304, scheduling systems 320 may maintain a second data structure including a mapping between physical locations and product identifiers. For example, scheduling systems 320 may manage a database storing and updating a second data structure that includes distance scores, physical distance, routes, and transportation systems between physical locations (such as a packing center) and products. In some embodiments, the first data structure is stored in a first database, the second data structure is stored in a second database different from the first database, and the second database is stored in a server within the fulfillment center.

In step 1306, scheduling systems 320 may receive a request to provide a delivery time estimate associated with a requested product. For example, one of client devices 350 may send a request to provide a delivery estimate as the user navigates in a product website. Alternatively, or additionally, a mobile device may generate a request for delivery time estimate when a user selects a product.

In step 1308, scheduling systems 320 may search and filtering the second data structure to identify at least one physical location associated with the requested product. In step 1310, scheduling systems 320 may request available inventory from fulfillment centers associated with the filtered physical locations. For example, scheduling systems 320 may contact internal front-end system 105 (FIG. 1) to request the inventory of the FC.

In step 1312, scheduling systems 320 may select a fulfillment center from the fulfillment centers based on availability of the product and a distance between the client device and the FC. In step 1314, scheduling systems 320 may search the first data structure, maintained in step 1302, to determine cutoff times associated with each of the at least one physical locations in the FC.

In step 1316, scheduling systems 320 may select one of the physical locations based on a comparison between the current time and respective cutoff times. For example, scheduling systems 320 may compare distance scores between different locations to select a physical location to fulfill the order. The selection may be based on identifying the location with lowest distance score, which may correlate with the latest cutoff time. In step 1318, scheduling systems 320 may return, in response to the request, a first cutoff time selected from the cutoff times. In some embodiments, the first cutoff time may be associated with a faster delivery estimate than other cutoff times in each of the physical locations. For example, scheduling systems 320 may return a selected cutoff time of 4 PM for the product requested in step 1306 when such cutoff time has the faster delivery estimate in the related locations. Other cutoff times of 5 PM or 6 PM associated with the location may be discarded based on having a later delivery date or time. In such embodiments, scheduling systems 320 may be configured to find the fastest possible delivery time from among the available cutoff times. For example, scheduling system 320 may query first data structures to associate each cutoff time with a delivery date and time.

Process 1300 may allow scheduling systems 320 to provide enhanced consumer experience when placing online orders. For example, through process 1300 scheduling systems 320 may not only determine the available delivery options but also select delivery options that would result in faster delivery dates and times. Thus, understanding cutoffs and their respective estimated deliveries may allow scheduling systems 320 to figure out the ideal delivery time that can be offered to the customer for fastest delivery time. In other embodiments, however, scheduling system 320 may perform the selection of cutoff times based on other optimization other than the fastest possible delivery time. For example, scheduling systems 320 may select cutoff times based in optimizing the number of packages that can be delivered at a first time or based on grouping shipments to minimize shipping costs.

Figure 14:
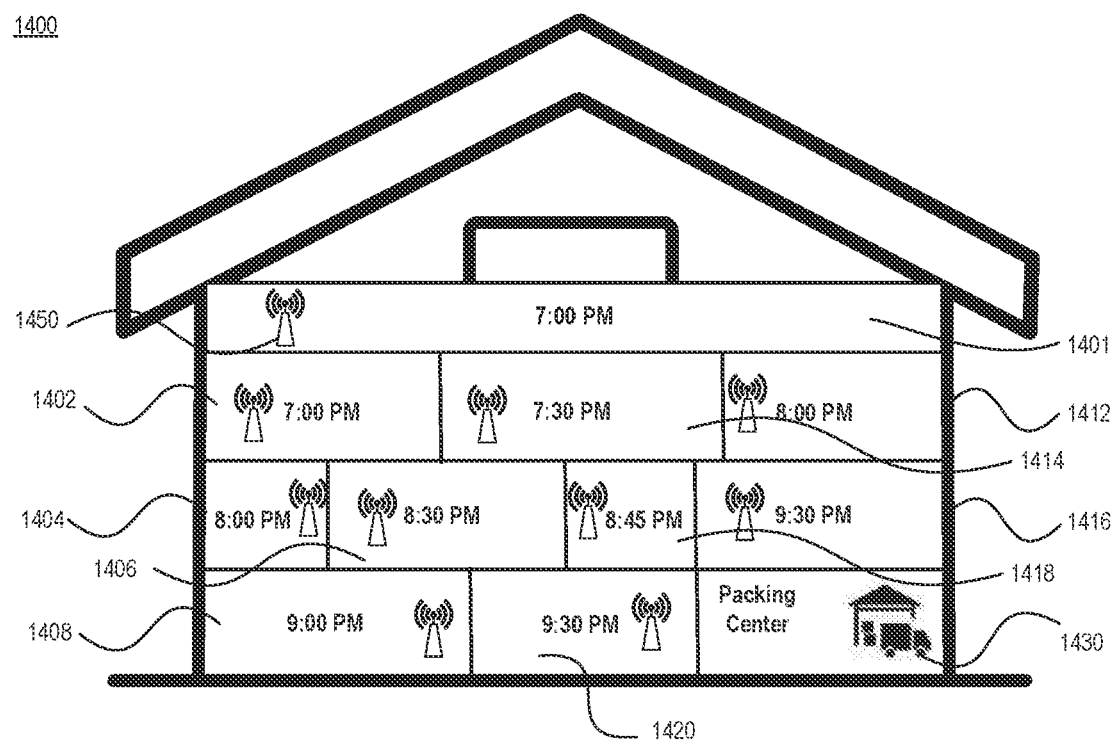
FIG. 14 is graphical representation of an exemplary FC divided in virtual zones with specific cutoff times.

FIG. 14 is graphical representation of an exemplary FC 1400 divided in virtual zones with specific cutoff times. As shown in FIG. 14, may include multiple levels and each level may be divided in virtual zones with specific cutoff times. Further FC 1400 may include a packaging center 1430, which may be similar or part of transportation system 107 (FIG. 1).

FC 1400 may include multiple virtual zones. Each of the virtual zones may be associated with shelf locations or pallet locations inside of an associated FC. For example, FC 1400 may include a first virtual zone 1401 which may be in the top most floor of the FC. Because first virtual zone 1401 is far away from the packing center 1430, first virtual zone 1401 receives an early cutoff time of 7 PM for first time delivery. Because products in first virtual zone 1401 are far away from packing center 1430, it may be necessary to start the order early to be able to meet first time delivery. Similarly, virtual zones 1402, 1414, and 1412, may also have early cutoff times because they are far away from packing center 1430.

Virtual zones that start to be closer to packing center 1430, such as virtual zones 1404, 1406, 1418, and 1416 may start having later cutoff times (e.g., 8:30 PM). Because they are physically closer to packing center 1430, FCs may afford to have later cutoff times and still meet the first time delivery option. Nonetheless, as shown in FIG. 14, virtual zones even in the same level of the FC may have different cutoff times, based on distance, availability of personnel, and/or transportation method.

As shown in FIG. 14, Virtual zones that are close or in the same level as packing center 1430 may receive the latest cutoff times. Because products in these zones can be delivered to the packing center quickly, virtual zones 1408 and 1420 may be assigned later cutoff times.

The virtualization of an FC allows systems FC 1400 to provide first time deliveries for longer. Particularly for products closer to the packing center, the different zones with specific cutoff assignments enables FC 1400 to offer first time, dawn, or fresh deliveries with later cutoffs.

As shown in FIG. 14, FC 1400 may include sensors 1450 in each one of the virtual zones. As previously disclosed in connection to FIGS. 2 and 10, sensors may be used as part of an item positioning system to determine whether a product is in one of the virtual zones and update first and second data structures. Sensors 1450 may be implemented with sensors 217A-217C (FIG. 2) and include wireless, image, scan, or weight sensors to determine the position of items within the FC. Thus, in certain embodiments virtual zones or physical locations may have optical or wireless tags attached, as sensors 1450, and the optical or wireless tags may be associated with a physical location identifier stored in a data structure such as the first data structure described in connection with FIG. 9.

Figure 15:
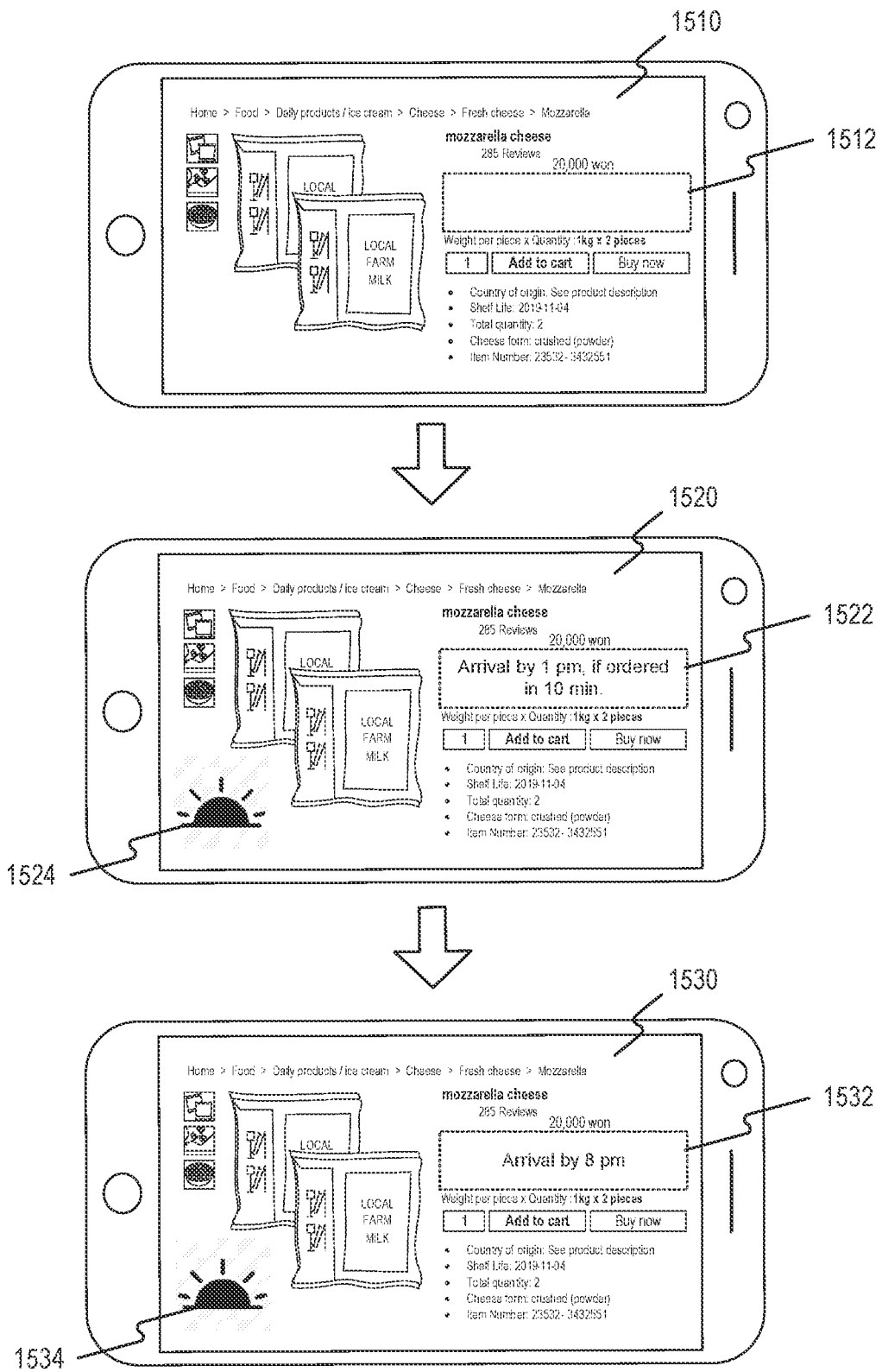
FIG. 15 is a front view of a sequence of Single Display Page exemplary graphical user interfaces in a mobile device, consistent with disclosed embodiments.

FIG. 15 is a front view of a sequence of Single Display Page exemplary graphical user interfaces in a mobile device, consistent with disclosed embodiments. FIG. 15 shows three graphical user interfaces (GUIs) that may be displayed in client devices 350 and/or user devices 102.

GUI 1510 shows a single product with a graphical description, text description, order information, and a dynamic text box. The dynamic textbox 1512 in GUI 1510 is empty. In some embodiments, dynamic textbox 1512 may be empty awaiting for calculations by scheduling systems 320.

GUI 1520 shows the same single product information but dynamic textbox 1512 has been substituted by dynamic text box 1522, which now specifies both estimated delivery date and expiration, displaying "Arrival by 1 pm, if ordered in 10 min." In some embodiments, electronic messages generated by scheduling systems 320 may include instructions to update dynamic textbox 1512 to dynamic textbox 1522. Moreover, in GUI 1520 the product display may be modified to include additional icons to indicate available delivery service. For example, the product displayed in GUI 1520 may be updated to show a first time delivery icon 1524, to show the product is available for dawn delivery based on cutoff and proximity to fulfillment centers. In some embodiments, first time delivery icon 1524 may include information specific to the product or the tentative delivery date/time. For example, first time delivery icon 1524 may include a message such as "before dinner," based on determinations from scheduling systems 320.

GUI 1530 shows the single product information but dynamic text box 1522 has been updated to dynamic textbox 1532. For example, the expiration time of 10 min may have lapsed from GUI 1520 to GUI 1530. Thus, scheduling systems 320 may have sent instructions to update the delivery estimate from 1 μm to 8 pm. Moreover, GUI 1530 may also show dawn delivery icon 1534 displayed on products that can be delivered by dawn next day.

FIG. 16 is an exemplary source code of a script configurable to generate or modify a webpage with delivery date estimates and/or available delivery options. Exemplary source code 1600 shows exemplary instructions and functions that may be employed to generate or modify a webpage to display available delivery options and estimated delivery times, as described in connection with FIGS. 9 and 11. For example, electronic messages generated and transmitted by scheduling systems 320 may include exemplary source code 1600. The syntax and instructions used in exemplary source code 1600 is exemplary and different syntaxis and functions can be also employed and/or substituted.

Exemplary source code 1600 may include headers 1601 including the html headers to identify and/or modify a webpage. Headers 1601 are examples of operations and headers that could be used. Exemplary source code 1600 may also include a document type identification portion 1602. Portion 1602 may include functions to evaluate whether a webpage is a cart page, order page, search page, or single product page. The functions detailed in portion 1602 show exemplary functions.

Exemplary source code 1600 may also include a dynamic textbox generation portion 1604. Functions and routines in portion 1604 may specify the messages and modification instructions, as discussed in connection to FIGS. 9 and 11. Further, exemplary source code 1600 may include a modification portion 1606 including options for modifications of the different webpages. Moreover, exemplary source code 1600 may include a timer portion 1608, which may include instructions to display a timer on the webpage that is correlated with expiration times, or remaining times, of the estimated delivery times for products.

Routines in portion 1604, modification portion 1606, and timer portion 1608 describe exemplary implementations and different or alternative implementations are possible.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system comprising:
   a plurality of sensors distributed throughout a fulfillment center, the plurality of sensors being configured to automatically collect tracking information of product locations within the fulfillment center;
   at least one processor coupled to the plurality of sensors; and at least one memory device storing instructions that configure the at least one processor to:

maintain a first data structure associating zones in the fulfillment center with cutoff times for first time delivery, the cutoff times being based on distances between the zones and a packing center of the fulfillment center;

in response to receiving an event from the plurality of sensors, update a second data structure associating products in the fulfillment center with one or more of the zones;

receive a request for product information from a client device, the request including a first product identifier and a postal code;

in response to the request, search the second data structure to identify at least one of the zones holding a product associated with the first product identifier and search the first data structure to determine cutoff times associated with the at least one of the zones; and transmit the cutoff times to the client device.

2. The system of claim 1, wherein the instructions further configure the at least one processor to:

receive, from a first scanning device, a first scan event comprising a second product identifier associated with one of the zones;

after receiving the first scan event, receiving a second scan event from a second scanning device, the second scan event comprising the second product identifier, the second scanning device being associated with the packing center;

determining a time lapsed from the first scan event to the second scan event; and modifying, based on the time lapsed, the cutoff time associated with the one of the zones in the first data structure.

3. The system of claim 1, wherein the plurality of sensors comprise cameras coupled with image recognition.

4. The system of claim 1, wherein the plurality of sensors comprise at least one of low-power wireless beacons or Radio-frequency identification tags.

5. The system of claim 1, wherein the plurality of sensors comprise weight sensors.

6. The system of claim 1, wherein the distances indicate a level of the fulfillment center in which the products are being stored.

7. The system of claim 6, wherein the instructions further configure the at least one processor to: adjust the distance based on available transportation methods between the zones and the packing center, the available transportation methods comprising conveyor belts.

8. The system of claim 1, wherein the zones stored in the first data structure specify shelf locations and pallet locations.

9. The system of claim 1, wherein the cutoff times in the first data structure are inversely proportional to respective ones of the associated distances.

10. The system of claim 1, wherein the instructions further configure the at least one processor to:

receive, from one of the plurality of sensors, a product event indicating that a product was placed on a shelf or pallet within one of the zones;

in response to receiving the product event, calculate a product distance to the packing center, the calculated product distance being based on a location of the one of the plurality of sensors; and updating the first data structure to include the product associated with the one of the zones and the calculated distance.

11. A computer-implemented method comprising:

maintaining a first data structure associating zones in a fulfillment center with cutoff times for first time delivery, the cutoff times being based on distances between the zones and a packing center of the fulfillment center;

in response to receiving an event from one of a plurality of sensors, updating a second data structure associating products in the fulfillment center with one or more of the zones, the plurality of sensors being distributed throughout the fulfillment center, the plurality of sensors being configured to automatically collect tracking information of product locations within the fulfillment center;

receiving a request for product information from a client device, the request including a first product identifier and a postal code;

in response to the request, searching the second data structure to identify at least one of the zones holding a product associated with the first product identifier and search the first data structure to determine cutoff times associated with the at least one of the zones; and transmitting the cutoff times to the client device.

12. The method of claim 11 further comprising:

receiving, from a first scanning device, a first scan event comprising a second product identifier associated with one of the zones;

after receiving the first scan event, receiving a second scan event from a second scanning device, the second scan event comprising the second product identifier, the second scanning device being associated with the packing center;

determining a time lapsed from the first scan event to the second scan event; and modifying, based on the time lapsed, the cutoff time associated with the one of the zones in the first data structure.

13. The method of claim 11, wherein the plurality of sensors comprise cameras coupled with image recognition.

14. The method of claim 11, wherein the plurality of sensors comprise at least one of low-power wireless beacons or Radio-frequency identification tags.

15. The method of claim 11, wherein the plurality of sensors comprise weight sensors.

16. The method of claim 11, wherein the distances indicate a level of the fulfillment center in which the products are being stored.

17. The method of claim 16 further comprising adjusting the distances based on available transportation methods between the zones and the packing center, the available transportation methods comprising conveyor belts.

18. The method of claim 11, wherein the zones stored in the first data structure specify shelf locations and pallet locations.

19. The method of claim 11, further comprising:

receiving, from one of the plurality of sensors, a product event indicating that a product was placed on a shelf or pallet within one of the zones;

in response to receiving the product event, calculate a product distance to the packing center, the calculated product distance being based on a location of the one of the plurality of sensors; and updating the first data structure to include the product associated with the one of the zones and the calculated distance.

20. A non-transitory computer readable medium storing instructions that, when executed by at least one processor, configure the at least one processor to perform operations comprising:

maintaining a first data structure associating zones in a fulfillment center with cutoff times for first time delivery, the cutoff times being based on distances between the zones and a packing center of the fulfillment center;

in response to receiving an event from one of a plurality of sensors, updating a second data structure associating products in the fulfillment center with one or more of the zones, the plurality of sensors being distributed throughout the fulfillment center, the plurality of sensors being configured to automatically collect tracking information of product locations within the fulfillment center;

receiving a request for product information from a client device, the request including a first product identifier and a postal code;

in response to the request, searching the second data structure to identify at least one of the zones holding a product associated with the first product identifier and search the first data structure to determine cutoff times associated with the at least one of the zones; and transmitting the cutoff times to the client device.

* * * * *